US 12,409,386 B2

(12) United States Patent
Yu et al.

(10) Patent No.: US 12,409,386 B2
(45) Date of Patent: Sep. 9, 2025

(54) DISPLAYING VISUAL FIELD PICTURE BASED ON INTERACTION ZONE ON A VIRTUAL MAP

(71) Applicant: Tencent Technology (Shenzhen) Company Limited, Guangdong (CN)

(72) Inventors: Dong Yu, Shenzhen (CN); Weixiang Yu, Shenzhen (CN); Jiaqi Pan, Shenzhen (CN); Ying Deng, Shenzhen (CN); Yun Yang, Shenzhen (CN); Qingbo Yu, Shenzhen (CN); Linying Xie, Shenzhen (CN); Zefeng Yang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 197 days.

(21) Appl. No.: 18/209,636

(22) Filed: Jun. 14, 2023

(65) Prior Publication Data
US 2023/0321541 A1  Oct. 12, 2023

Related U.S. Application Data

(63) Continuation of application No. PCT/CN2022/128692, filed on Oct. 31, 2022.

(30) Foreign Application Priority Data

Jan. 14, 2022  (CN) .......................... 202210044899.1

(51) Int. Cl.
*A63F 13/5378* (2014.01)
*A63F 13/5375* (2014.01)
(Continued)

(52) U.S. Cl.
CPC ...... *A63F 13/5378* (2014.09); *A63F 13/5375* (2014.09); *A63F 13/822* (2014.09);
(Continued)

(58) Field of Classification Search
CPC .............. A63F 13/5378; A63F 13/5375; A63F 13/822; A63F 13/837; A63F 13/86; A63F 2300/8082
(Continued)

(56) References Cited

U.S. PATENT DOCUMENTS 7,614,954 B2 * 11/2009 Okazaki .............. A63F 13/5258
463/32
10,345,897 B2 * 7/2019 Verfaillie ................ A63F 13/00
(Continued)

FOREIGN PATENT DOCUMENTS

CN  112546625 A  3/2021
CN  113350783 A  9/2021
(Continued)

OTHER PUBLICATIONS

International Search Report and Written Opinion received for PCT Patent Application No. PCT/CN2022/128692 with English Translation, mailed on Jan. 12, 2023, 13 pages.
(Continued)

*Primary Examiner* — Allen Chan
(74) *Attorney, Agent, or Firm* — ARENTFOX SCHIFF LLP

(57) ABSTRACT

A method includes displaying a virtual map of a virtual environment including an identification of a first virtual object and an identification of a second virtual object in the virtual environment, and displaying a hot zone display element on the virtual map in response to a determination that the first virtual object interacts with the second virtual object. The hot zone display element indicates a map area in
(Continued)

which the first virtual object interacts with the second virtual object. The method further includes displaying a visual field picture of the virtual environment from a perspective of the first virtual object or the second virtual object in response to a trigger operation on the hot zone display element.

20 Claims, 11 Drawing Sheets

(51) Int. Cl.
    *A63F 13/822*     (2014.01)
    *A63F 13/837*     (2014.01)
    *A63F 13/86*     (2014.01)

(52) U.S. Cl.
    CPC ............ *A63F 13/837* (2014.09); *A63F 13/86* (2014.09); *A63F 2300/8082* (2013.01)

(58) Field of Classification Search
    USPC .......................................................... 463/31
    See application file for complete search history.

(56) References Cited

U.S. PATENT DOCUMENTS

| | | | |
|---|---|---|---|
| 10,453,226 B1 * | 10/2019 | Burrows | G01C 21/367 |
| 10,845,942 B2 * | 11/2020 | Shimada | G06F 3/04845 |
| 11,623,147 B2 * | 4/2023 | Wang | G06T 11/206 |
| | | | 345/629 |
| 11,983,840 B2 * | 5/2024 | Sang | G06T 17/05 |

FOREIGN PATENT DOCUMENTS

| | | |
|---|---|---|
| CN | 113426114 A | 9/2021 |
| CN | 114404972 A | 4/2022 |

OTHER PUBLICATIONS

"[PUBG Competition] Pubg Doncup Squad #1—Final [Watching Viewpoint]", Shobosuke Channel, Available on internet at: https://www.youtube.com/watch?v=tMjJEBel9dl, 2017.

"MGS2HD Nov. 23, 2007 Metal Gear Solid 2 HD, [PS3]", YouTube, Available online at: https://www.youtube.com/watch?v=AgrTvW2EoHg, 2019.

Office Action received for Japanese Patent Application No. 2024-523416, mailed on May 7, 2025, 10 pages (5 pages of English Translation and 5 pages of Original Document).

* cited by examiner

DISPLAYING VISUAL FIELD PICTURE BASED ON INTERACTION ZONE ON A VIRTUAL MAP

RELATED APPLICATIONS

This application is a continuation of International Application No. PCT/CN2022/128692, filed on Oct. 31, 2022, which claims priority to Chinese Patent Application No. 202210044899.1, entitled "METHOD AND APPARATUS FOR DISPLAYING VISUAL FIELD PICTURE AND DEVICE," filed on Jan. 14, 2022. The disclosures of the prior applications are hereby incorporated by reference in their entirety.

FIELD OF THE TECHNOLOGY

This application relates to the field of a virtual world, including a method and apparatus for displaying a visual field picture and a device.

BACKGROUND OF THE DISCLOSURE

In a network game having a virtual environment, such as a massive multiplayer online role playing game, a player may play one or more virtual objects and control the activities and behaviors of the virtual world in the game.

An identification of the virtual object controlled by the player is usually displayed in a virtual map of the network game. The identification is used for indicating the position and/or moving direction of the virtual object, and interactive information from the perspective of the virtual object cannot be acquired by a battle participating player or a battle watching player.

Taking a battle watching system as an example, the identifications of a first virtual object and a second virtual object belonging to different camps are displayed in the virtual map of the battle watching system. The battle watching player can only acquire the positions and/or moving directions of the first virtual object and the second virtual object on the virtual map, and cannot timely acquire virtual battle information from the perspective of the first virtual object or the second virtual object.

SUMMARY

The embodiments of this disclosure provide a method and apparatus for displaying a visual field picture and a device. The technical solutions are as follows.

In an embodiment, a method includes displaying a virtual map of a virtual environment including an identification of a first virtual object and an identification of a second virtual object in the virtual environment, and displaying a hot zone display element on the virtual map in response to a determination that the first virtual object interacts with the second virtual object. The hot zone display element indicates a map area in which the first virtual object interacts with the second virtual object. The method further includes displaying a visual field picture of the virtual environment from a perspective of the first virtual object or the second virtual object in response to a trigger operation on the hot zone display element.

In an embodiment, an apparatus for displaying a visual field picture includes processing circuitry configured to display a virtual map of a virtual environment including an identification of a first virtual object and an identification of a second virtual object in the virtual environment, and display a hot zone display element on the virtual map in response to a determination that the first virtual object interacts with the second virtual object. The hot zone display element indicates a map area in which the first virtual object interacts with the second virtual object. The processing circuitry is further configured to display a visual field picture of the virtual environment from a perspective of the first virtual object or the second virtual object in response to a trigger operation on the hot zone display element.

In an embodiment, a non-transitory computer-readable storage medium stores computer-readable instructions thereon, which, when executed by processing circuitry, cause the processing circuitry to perform a method for displaying a visual field picture. The method includes displaying a virtual map of a virtual environment including an identification of a first virtual object and an identification of a second virtual object in the virtual environment, and displaying a hot zone display element on the virtual map in response to a determination that the first virtual object interacts with the second virtual object. The hot zone display element indicates a map area in which the first virtual object interacts with the second virtual object. The method further includes displaying a visual field picture of the virtual environment from a perspective of the first virtual object or the second virtual object in response to a trigger operation on the hot zone display element.

The map area in which the first virtual object interacts with the second virtual object can be accurately and timely acquired by displaying the hot zone display element on the virtual map. In addition, interactive information from the perspective of the virtual objects can be acquired by switching to the visual field picture of the corresponding virtual object by the trigger operation on the hot zone display element.

DESCRIPTION OF EMBODIMENTS

The method provided in this disclosure may be applied to an application program having a virtual environment and a virtual object. Exemplarily, for the application program that supports the virtual environment, a user can control the movement of the virtual object in the virtual environment. Exemplarily, the method provided in this disclosure may be applied to any one of a virtual reality (VR) application program, an augmented reality (AR) program, a three-dimensional map program, a VR game, an AR game, a first-person shooting (FPS) game, a third-person shooting (TPS) game, multiplayer online battle arena (MOBA) games, and a simulation game (SLG).

Exemplarily, the game in the virtual environment is composed of one or more maps of a game world. The virtual environment in the game simulates the real world scene. The user can manipulate the virtual object in the game to perform actions, including walking, running, jumping, shooting, fighting, driving, attacking other virtual objects using a virtual weapon, and launching a charged attack on other virtual objects using the virtual weapon in the virtual environment. The interaction is strong, and multiple players can play an arena game by online teaming.

In some embodiments, the application program may be a program, such as a shooting game, a racing game, a role-playing game, an adventure game, a sandbox game, and a battle arena game. The client may support at least one of a Windows operating system, an Apple operating system, an Android operating system, an IOS operating system, and a LINUX operating system. Clients of different operating systems may be interconnected. In some embodiments, the client is a program suitable for a mobile terminal having a touchscreen.

In some embodiments, the client is an application program developed based on a three-dimensional engine, such as a Unity engine.

The terminal in this disclosure may be a desktop computer, a laptop portable computer, a mobile phone, a tablet computer, an e-book reader, a moving picture experts group audio layer III (MP3) player, a moving picture experts group audio layer IV (MP4) player, and the like. The client that supports the virtual environment, such as a client that supports an application program of a three-dimensional virtual environment, is installed and run on the terminal. The application program may be any one of a battle royale (BR) game, the VR application program, the AR program, the three-dimensional map program, the TPS game, the FPS game, and the MOBA game. Alternatively, the application program may be a stand-alone application program, such as a stand-alone 3D game program, and may also be an online application program.

Figure 1:
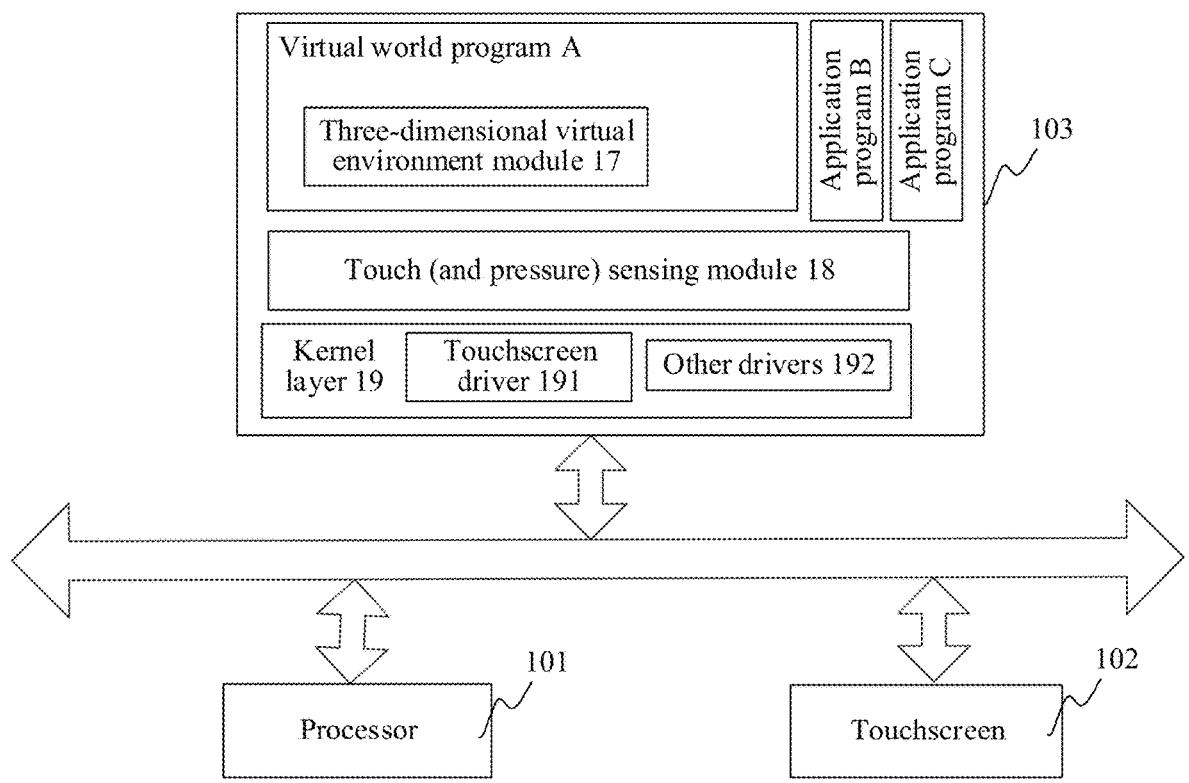
FIG. 1 is a schematic structural diagram of a terminal provided in an exemplary embodiment of this disclosure.

FIG. 1 is a schematic structural diagram of a terminal provided in an exemplary embodiment of this disclosure. The terminal includes a processor 101, a touchscreen 102, and a memory 103.

The processor 101 may be at least one of a single-core processor, a multi-core processor, an embedded chip, and a processor with an ability to execute instructions.

The touchscreen 102 includes a common touchscreen or a pressure sensing touchscreen. A common touchscreen may measure a pressing operation or a sliding operation applied on the touchscreen 102. The pressure sensing touchscreen may measure pressing force exerted on the touchscreen 102.

The memory 103 stores an executable program of the processor 101. Illustratively, the memory 103 stores a virtual environment program A, an application program B, an application program C, a touch pressure sensing module 18, and a kernel layer 19 of an operating system. The virtual environment program A is an application program developed based on a three-dimensional virtual environment module 17. Alternatively, the virtual environment program A includes, but is not limited to, at least one of the game program, the VR program, the three-dimensional map program, and a three-dimensional presentation program developed by the three-dimensional virtual environment module (also referred to as a virtual environment module) 17. For example, when the operating system of the terminal uses the Android operating system, the virtual environment program A is developed using the Java programming language and the C #language. In another example, when the operating system of the terminal uses the IOS operating system, the virtual environment program A is developed using the Object-C programming language and the C #language.

The three-dimensional virtual environment module 17 supports multiple operating system platforms. Illustratively, the three-dimensional virtual environment module may be configured to develop programs in multiple fields, such as the field of the game development, the field of the VR, and the field of the three-dimensional map. The specific type of the three-dimensional virtual environment module 17 is not limited in the embodiments of this disclosure. The following embodiments are illustrated by taking an example. For example, the three-dimensional virtual environment module 17 is developed using the Unity engine.

The touch (and pressure) sensing module 18 is configured to receive a touch event (and a pressure touch event) reported by a touchscreen driver 191. Alternatively, the touch sensing module may not have a pressure sensing function and does not receive the pressure touch event. The touch event includes: a type of the touch event and a coordinate value. The type of the touch event includes, but is not limited to: a touch start event, a touch movement event and, a touch drop event. The pressure touch event includes: a pressure value of the pressure touch event and a coordinate value. The coordinate value is used for indicating a touch position of a pressure touch operation on a display screen. Alternatively, a horizontal axis is established in a horizontal direction of the display screen, and a vertical axis is established in a vertical direction of the display screen to obtain a two-dimensional coordinate system.

Illustratively, the kernel layer 19 includes the touchscreen driver 191 and other drivers 192. The touchscreen driver 191 is configured to detect the pressure touch event. Detected by the touchscreen driver 191, the pressure touch event is conveyed to the pressure sensing module 18.

Other drivers 192 may be drivers associated with the processor 101, drivers associated with the memory 103, drivers associated with a network component, drivers associated with a sound component, and the like.

It will be appreciated by those skilled in the art that the above is a general illustration of the structure of the terminal. In different embodiments, the terminal may have more or fewer components. For example, the terminal may also include a gravity acceleration sensor, a gyroscope sensor, and a power supply.

Figure 2:
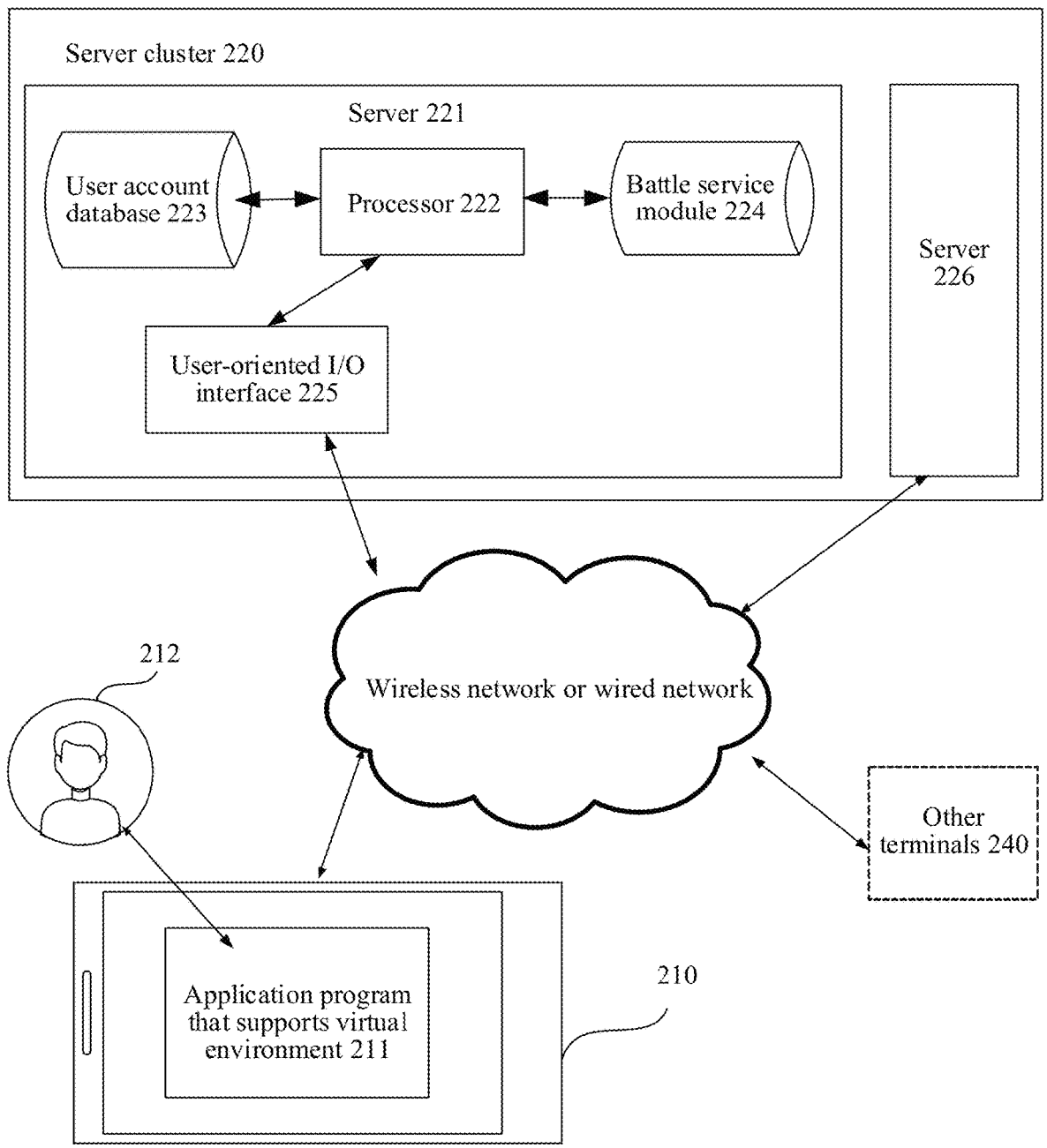
FIG. 2 is a structural block diagram of a computer system provided in an exemplary embodiment of this disclosure.

FIG. 2 shows a structural block diagram of a computer system provided in an exemplary embodiment of this disclosure. The computer system 200 includes a terminal 210 and a server cluster 220.

A client 211 that supports the virtual environment is installed and run on the terminal 210, and the client 211 may be an application program that supports the virtual environment. When the terminal runs the client 211, the user interface of the client 211 is displayed on the screen of the terminal 210. The client may be any one of the FPS game, the TPS game, the MOBA game, the battle arena game, and the SLG. This embodiment is illustrated by taking the client being the FPS game as an example. The terminal 210 is a terminal used by a first user 212, and the first user 212 uses the terminal 210 to control a first virtual object in the virtual environment to perform activities. The first virtual object may be referred to as the first virtual object of the first user 212. Activities of the first virtual object include, but are not limited to at least one of adjusting body postures, crawling, walking, running, riding, flying, jumping, driving, picking up, shooting, attacking, and throwing. Illustratively, the first virtual object is a virtual character, such as a simulated character or an animated character.

The device type of the terminal 210 includes at least one of a smart phone, the tablet computer, the e-book reader, the MP3 player, the MP4 player, the laptop portable computer, and the desktop computer.

Only one terminal is shown in FIG. 2, but there are a plurality of other terminals 240 in different embodiments. In some embodiments, at least one other terminal 240 is a terminal corresponding to the developer. Development and editing platforms of the client having the virtual environment are installed on other terminals 240. The developer may edit and update the client on other terminals 240, and the updated client installation package is transmitted to the server cluster 220 by a wired network or a wireless network. The terminal 210 may download the client installation package from the server cluster 220 to update the client.

The terminal 210 and other terminals 240 are connected to the server cluster 220 by the wireless network or the wired network.

The server cluster 220 includes at least one of a server, a plurality of servers, a cloud computing platform, and a virtualized center. The server cluster 220 is configured to provide background services for the client that supports the three-dimensional virtual environment. Alternatively, the server cluster 220 undertakes the primary computing work, and the terminal undertakes the secondary computing work; the server cluster 220 undertakes the secondary computing work, and the terminal undertakes the primary computing work; or the server cluster 220 and the terminal use a distributed computing architecture to perform cooperative computing.

Alternatively, both the terminal and the server are computer devices.

In an illustrative example, the server cluster 220 includes a server 221 and a server 226. The server 221 includes a processor 222, a user account database 223, a battle service module 224, and a user-oriented input/output interface (I/O interface) 225. The processor 222 is configured to load the instructions stored in the server 221 and process data in the user account database 223 and the battle service module 224. The user account database 223 is used for storing data of the user accounts used by the terminal 210 and other terminals 240, such as avatars, nicknames, battle effectiveness, and a service areas of the user accounts. The battle service module 224 is configured to provide a plurality of battle rooms for the user to battle. The user-oriented I/O interface 225 is configured to establish communication exchange data by the terminal 210 and the wireless network or the wired network.

In conjunction with the above description of the virtual environment and the implementation environment, the data synchronization method provided in the embodiments of this disclosure will be described below.

Figure 3:
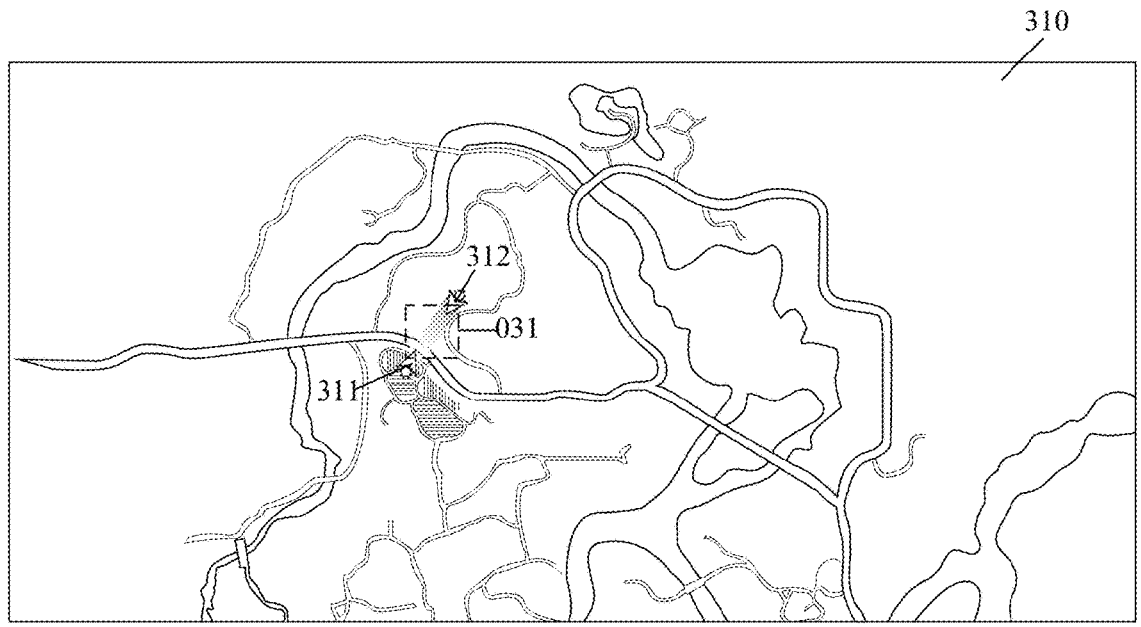
FIG. 3 is a schematic illustration of an interface of a method for displaying a visual field picture provided in an exemplary embodiment of this disclosure.

FIG. 3 shows a schematic illustration of an interface of a method for displaying a visual field picture provided in an exemplary embodiment of this disclosure.

A first object identification 311 corresponding to a first virtual object and a second object identification 312 corresponding to a second virtual object are displayed on a virtual map 310. Alternatively, the first virtual object and the second virtual object may belong to the same camp, and the two are teammates; alternatively, the first virtual object and the second virtual object belong to different camps, and the two are antagonists to battle.

The first object identification 311 and the second object identification 312 are used for displaying the positions of the first virtual object and the second virtual object on the virtual map 310. Alternatively, arrows on the first object identification 311 and the second object identification 312 are used for indicating the moving directions or the visual field directions of the first virtual object and the second virtual object.

The first object identification 311 and the second object identification 312 are close to each other, a hot zone display element 031 is displayed on the virtual map 310 in a case that the first virtual object interacts with the second virtual object, the hot zone display element 031 being used for indicating a map area in which the first virtual object interacts with the second virtual object.

Illustratively, the interaction of the first virtual object and the second virtual object includes one of a unidirectional interaction and a bidirectional interaction.

The unidirectional interaction means that the first virtual object unidirectionally acts on the second virtual object, and the second virtual object does not unidirectionally act on the first virtual object; or the second virtual object unidirectionally acts on the first virtual object, and the first virtual object does not unidirectionally act on the second virtual object. The bidirectional interaction means that the first virtual object acts on the second virtual object, and the second virtual object acts on the first virtual object. In the embodiments of this disclosure, the unidirectional interaction means that the first virtual object unidirectionally acts on the second virtual object, and the second virtual object does not act on the first virtual object.

Illustratively, the interaction of the first virtual object and the second virtual object includes at least one of the following.

Discovery interaction that can be used when the first virtual object and the second virtual object are teammates or antagonists. Illustratively, the discovery interaction includes one of the following: the first virtual object appears in a visual field of the second virtual object, and the second virtual object does not appear in the visual field of the first virtual object; the second virtual object appears in the visual field of the first virtual object, and the first virtual object does not appear in the visual field of the second virtual object; the first virtual object and the second virtual object appear in each other's visual field. Among them, the first two are the unidirectional interactions, and the third is the bidirectional (mutual) interaction.

Attack interaction that can be used when the first virtual object and the second virtual object are antagonists. Illustratively, the attack interaction includes one of the following: the first virtual object launches an attack on the second virtual object, and the second virtual object does not launch the attack on the first virtual object; the second virtual object launches the attack on the first virtual object, and the first virtual object does not launch the attack on the second virtual object; the first virtual object and the second virtual object attack each other. Among them, the first two are the unidirectional interactions, and the third is the bidirectional interaction.

Gain interaction that is an interaction to increase an attribute value of the first virtual object and/or the second virtual object and can be used when the first virtual object and the second virtual object are teammates. Illustratively, the gain interaction includes one of the following: the first virtual object performs a gain behavior on the second virtual object, and the second virtual object does not perform the gain behavior on the first virtual object; the second virtual object performs the gain behavior on the first virtual object, and the first virtual object does not perform the gain behavior on the second virtual object; the first virtual object and the second virtual object perform the gain behavior on each other. Among them, the first two are the unidirectional interactions, and the third is the bidirectional interaction. For example, the first virtual object releases a treatment skill to the second virtual object such that the health point of the second virtual object is increased. In another example, the first virtual object and the second virtual object exchange virtual items to increase the battle value of the two.

Referring to FIG. 3, the distance between the first object identification 311 and the second object identification 312 displayed on the virtual map 310 is gradually shortened during the approach of the first virtual object and the second virtual object. The hot zone display element 031 is displayed between the first object identification 311 and the second object identification 312 when one of the above interactions occurs.

For example, if the first virtual object and the second virtual object appear in each other's visual field, or the first virtual object and the second virtual object attack each other, the hot zone display element 031 may be displayed between the first object identification 311 and the second object identification 312.

Alternatively, the display style of the hot zone display element 031 is a rectangular area. The rectangular region may be a gradient bar, and the transparency of the gradient bar varies according to the interaction condition between the first virtual object and the second virtual object.

For example, if the first virtual object finds the second virtual object, and the second virtual object does not find the first virtual object, then the hot zone display element 031 is displayed as a yellow gradient bar that points to the second object identification 312 from the first object identification 311. The transparency of the yellow gradient bar gradually increases from the first object identification 311 to the second object identification 312. As such, the end of the hot zone display element 031 near the first object identification 311 has the lowest transparency, and the end near the second object identification 312 has the highest transparency. Alternatively, the end of the hot zone display element 031 near the first object identification 311 is displayed as an opaque yellow area on the virtual map 310.

In another example, if the first virtual object and the second virtual object attack each other, then the hot zone display element 031 is displayed as a red gradient bar that points to the middle position of the two from the first object identification 311 and the second object identification 312. The transparency of the gradient bar gradually increases from two (opposing) ends to the middle of the red gradient bar. As such, the two ends of the hot zone display element 031 near the first object identification 311 and near the second object identification 312 have the lowest transparency, and the middle of the red gradient bar has the highest transparency. Both ends of the hot zone display element 031 are displayed as opaque red areas on the virtual map 310.

Illustratively, the hot zone display element 031 includes at least one of a first hot zone display element, a second hot zone display element, and a third hot zone display element depending on different interactions between the first virtual object and the second virtual object.

The first hot zone display element is used for indicating that the first virtual object and/or the second virtual object appears in a visual field of the other party, the second hot zone display element is used for indicating that the first virtual object and/or the second virtual object launches an attack on the other party, and the third hot zone display element is used for indicating a gain interaction of the first virtual object and the second virtual object.

Alternatively, the first hot zone display element, the second hot zone display element, and the third hot zone display element have different display priorities.

For example, the display priority of the second hot zone display element is higher than that of the first hot zone display element. In a case that the first virtual object finds the second virtual object, and the first virtual object launches an attack on the second virtual object, then the second hot zone display element is displayed between the first object identification 311 and the second object identification 312, and the first hot zone display element is completely covered by the second hot zone display element.

Subsequently, the displaying the hot zone display element is canceled in a case that a distance between the first virtual object and the second virtual object exceeds a preset value. At this time, the first hot zone display element may be displayed between the first object identification 311 and the second object identification 312.

Illustratively, a visual field picture of the first virtual object or the second virtual object is displayed in response to a trigger operation on the hot zone display element 031.

Alternatively, displaying the visual field picture of the first virtual object or the second virtual object may be implemented as: displaying a visual field picture of a virtual object who performs the unidirectional interaction first.

Taking the virtual map displayed in a battle watching system as an example, in a case that the first virtual object performs the unidirectional interaction on the second virtual object first, a visual field range of the first virtual object is displayed in the display interface of the battle watching player, and the identification of the second virtual object is displayed in the visual field range. Accordingly, the second virtual object can be displayed in the display interface of a management account corresponding to the first virtual object (namely, the first virtual object finds the second virtual object); the first virtual object cannot be displayed in the display interface of a management account corresponding to the second virtual object (namely, the second virtual object does not find the first virtual object).

Still taking the virtual map displayed in a battle watching system as an example, in a case that the second virtual object performs the unidirectional interaction on the first virtual object first, a visual field range of the second virtual object is displayed in the display interface of the battle watching player, and the second virtual object launches an attack on the first virtual object in the visual field range. Accordingly, in the display interface of the management account corresponding to the first virtual object, it is displayed that the first virtual object launches an attack on the second virtual object, and the attack launched by the second virtual object on the first virtual object can be displayed (namely, the first virtual object and the second virtual object attack each other, and the second virtual object launches the attack on the first virtual object first); in the display interface of the management account corresponding to the second virtual object, it is displayed that the second virtual object launches the attack on the first virtual object, and the attack launched by the first virtual object on the second virtual object can be displayed.

Figure 4:
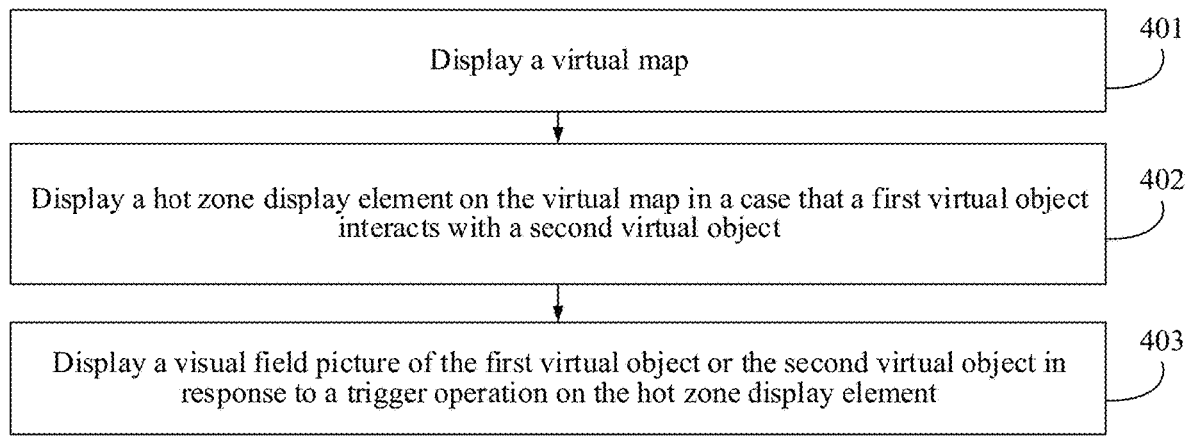
FIG. 4 is a flowchart of a method for displaying a visual field picture provided in an exemplary embodiment of this disclosure.

Illustratively, as shown in FIG. 4, an embodiment of this disclosure provides a flowchart of a method for displaying a visual field picture. The interaction between the first virtual object and the second virtual object can be accurately and timely acquired by displaying the hot zone display element on the virtual map. The method for displaying a visual field picture provided in an embodiment of this disclosure is applied to a terminal, and the method includes the following steps.

Step 401: Display a virtual map. For example, a virtual map is displayed of a virtual environment including an identification of a first virtual object and an identification of a second virtual object in the virtual environment.

Illustratively, the virtual map displays an identification of a first virtual object and an identification of a second virtual object. For example, the identification of the first virtual object is a first object identification, and the identification of the second virtual object is a second object identification.

The display style of the identification may include at least one of: dots, arrows, and regular graphics having directionality. Alternatively, the periphery of the identification may also be displayed with animation effects.

For example, the display style of the identification includes dots and arrows. The dots are used for indicating the positions of the corresponding virtual object on the virtual map, and the arrows are used for indicating the moving directions of the virtual object. For example, the first virtual object moves, and the identification is displaced on the virtual map based on the movement of the first virtual object. In addition, the identification has an external lighting effect on the periphery of the identification.

Illustratively, the first virtual object and the second virtual object belong to the same camp or different camps. If the first virtual object and the second virtual object belong to the same camp, the two are teammates; if the first virtual object and the second virtual object belong to different camps, the two are antagonists.

Illustratively, the identification is used for displaying at least one of the positions, the moving directions, and the visual field directions of the first virtual object or the second virtual object on the virtual map.

Figure 5:
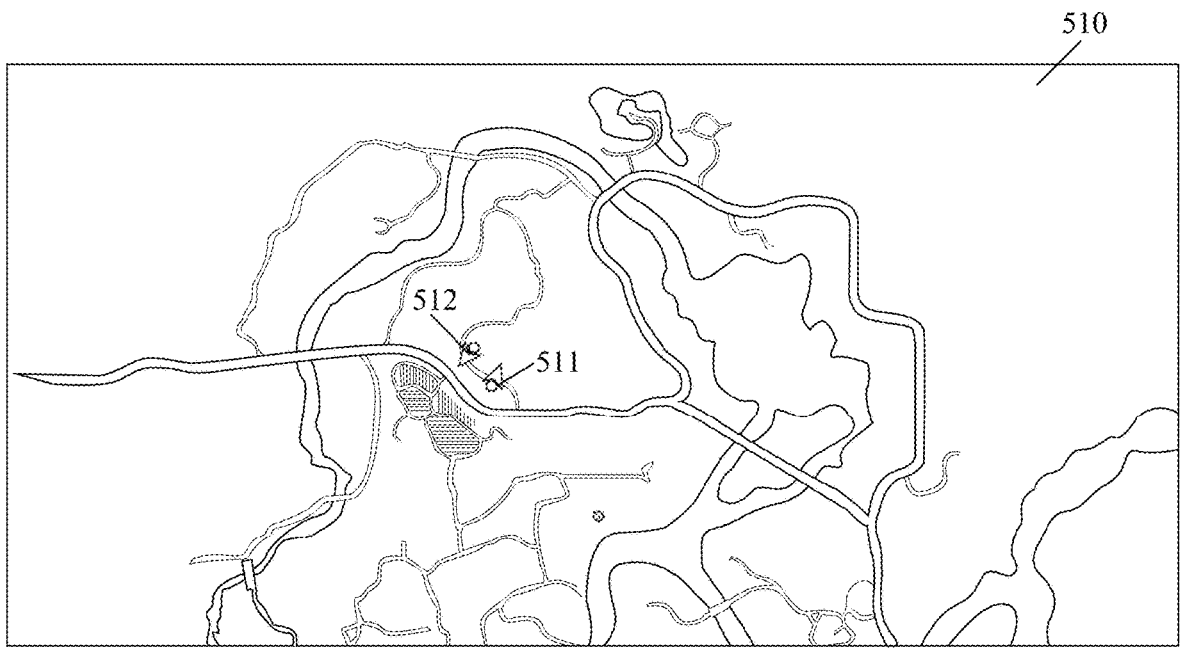
FIG. 5 is a schematic illustration of an interface when no interaction occurs provided in an exemplary embodiment of this disclosure.

FIG. 5 shows a schematic illustration of an interface when no interaction occurs provided in an exemplary embodiment of this disclosure. A first object identification 511 and a second object identification 512 are displayed on a virtual map 510.

The first object identification 511 and the second object identification 512 are used for displaying the positions of the first virtual object and the second virtual object on the virtual map 510. The positions of the first object identification 511 and the second object identification 512 on the virtual map 510 vary depending on the movements of the first virtual object and the second virtual object. Alternatively, arrows on the first object identification 511 and the second object identification 512 are used for indicating the moving directions or the visual field directions of the first virtual object and the second virtual object.

The relative distance of the first object identification 511 and the second object identification 512 on the virtual map 510 is shortened, and the two identifications are gradually close to each other in a case that the first virtual object interacts with the second virtual object.

Alternatively, the entirety of the first object identification 511 and the second object identification 512 exhibits an external yellow lighting. The transparency of the external lighting can be adjusted based on the distance between the first virtual object and the second virtual object: the closer the distance between them is, the lower the transparency becomes; the greater the distance is, the higher the transparency becomes.

Step 402: Display a hot zone display element on the virtual map in a case that a first virtual object interacts with a second virtual object. For example, a hot zone display element is displayed on the virtual map in response to a determination that the first virtual object interacts with the second virtual object, the hot zone display element indicating a map area in which the first virtual object interacts with the second virtual object.

Illustratively, the hot zone display element is used for indicating a map area in which the first virtual object interacts with the second virtual object. Alternatively, the hot zone display element is used for indicating a map area with the first virtual object interacting with the second virtual object.

Illustratively, a hot zone refers to an area in which the first virtual object interacts with the second virtual object.

The interaction of the first virtual object and the second virtual object includes one of a unidirectional interaction and a bidirectional interaction.

For example, if the first virtual object launches an attack on the second virtual object, and the second virtual object does not launch an attack on the first virtual object, then the interaction of the first virtual object and the second virtual object is determined as the unidirectional interaction. In another example, if the first virtual object and the second virtual object appear in each other's visual field, then the interaction of the first virtual object and the second virtual object is determined as the bidirectional interaction.

Illustratively, the interaction of the first virtual object and the second virtual object includes at least one of the following.

Discovery interaction that can be used when the first virtual object and the second virtual object are teammates or antagonists.

For example, taking a virtual shooting game as an example, the first virtual object appears in the shooting range of the second virtual object, and the visual field of the first virtual object is oriented towards the second virtual object.

Attack interaction that can be used when the first virtual object and the second virtual object are antagonists.

Still taking the virtual shooting game as an example, the second virtual object is in the shooting range of the first virtual object, the second virtual object is a virtual object closest to the aiming center of the first virtual object in the visual field range of the first virtual object, and the first virtual object shoots the second virtual object.

Gain interaction that is an interaction to increase an attribute value of the first virtual object and/or the second virtual object and can be used when the first virtual object and the second virtual object are teammates.

For example, the first virtual object releases a treatment skill to the second virtual object such that the health point of the second virtual object is increased. In another example, the first virtual object and the second virtual object exchange virtual items to increase the battle value of the other party.

Illustratively, according to the different interactions between the first virtual object and the second virtual object, the hot zone display element includes at least one of the following:
- a first hot zone display element for indicating that the first virtual object and/or the second virtual object appears in a visual field of the other party;
- a second hot zone display element for indicating that the first virtual object and/or the second virtual object launches an attack on the other party; and
- a third hot zone display element for indicating a gain interaction of the first virtual object and the second virtual object.

For example, the first hot zone display element is displayed on the virtual map in a case that the first virtual object interacts with the second virtual object, and the second virtual object appears in the visual field of the first virtual object. In another example, the second hot zone display element is displayed on the virtual map in a case that the first virtual object interacts with the second virtual object, and the first virtual object launches an attack on the second virtual object. In another example, the third hot zone display element is displayed on the virtual map in a case that the first virtual object interacts with the second virtual object, and the first virtual object and the second virtual object exchange the virtual items.

Step 403: Display a visual field picture of the first virtual object or the second virtual object in response to a trigger operation on the hot zone display element. For example, a visual field picture of the virtual environment is displayed from a perspective of the first virtual object or the second virtual object in response to a trigger operation on the hot zone display element.

Illustratively, the visual field picture refers to a display picture from the perspective of a virtual object. Taking the virtual shooting game as an example, the visual field picture of the first virtual object is based on the visual field direction of the first virtual object, and the visual field picture thereof includes: a virtual map appearing in the perspective of the first virtual object, other virtual objects and/or virtual objects on the virtual map appearing in the perspective of the first virtual object.

The trigger operation on the hot zone display element includes, but is not limited to at least one of the following: one-click operation on the hot zone display element, a double-click operation on the hot zone display element, a touch operation on the hot zone display element, and a sliding operation on the hot zone display element. For example, the visual field picture of the first virtual object is displayed in response to the one-click operation on the hot zone display element.

Alternatively, displaying the visual field picture of the first virtual object or the second virtual object may be implemented as: displaying a visual field picture of a virtual object who performs the unidirectional interaction first.

For example, the first virtual object finds the second virtual object, and the second virtual object does not find the first virtual object. The first virtual object and the second virtual object are close to each other, and the hot zone display element is displayed on the virtual map.

The second virtual object appears in the visual field of the first virtual object, and the first virtual object does not appear in the visual field of the second virtual object. Subsequently, the visual field of the first virtual object is displayed in response to the trigger operation on the hot zone display element, and the identification of the second virtual object is displayed in the visual field.

In another example, the first virtual object and the second virtual object attack each other, and the second virtual object launches an attack on the first virtual object first. The first virtual object is close to and interacts with the second virtual object, and the hot zone display element is displayed on the virtual map.

The second virtual object finds the first virtual object and launches an attack on the first virtual object first, and the first virtual object launches an attack on the second virtual object after receiving the attack. Subsequently, the visual field of the second virtual object is displayed in response to the trigger operation on the hot zone display element, and the identification of the first virtual object is displayed in the visual field.

In summary, in the method for displaying a visual field picture provided in the embodiments of this disclosure, the map area in which the virtual objects interact can be accurately and timely acquired by displaying the hot zone display element on the virtual map. In addition, interactive information from the perspective of the virtual objects can be acquired by switching to the visual field picture of the corresponding virtual object by the trigger operation on the hot zone display element.

According to the foregoing, the hot zone display element is used for indicating a map area in which the first virtual object interacts with the second virtual object. The interaction between the first virtual object and the second virtual object includes one of a unidirectional interaction and a bidirectional interaction.

Alternatively, the styles of the hot zone display elements are different according to the difference of the unidirectional interaction and the bidirectional interaction.

Figure 6:
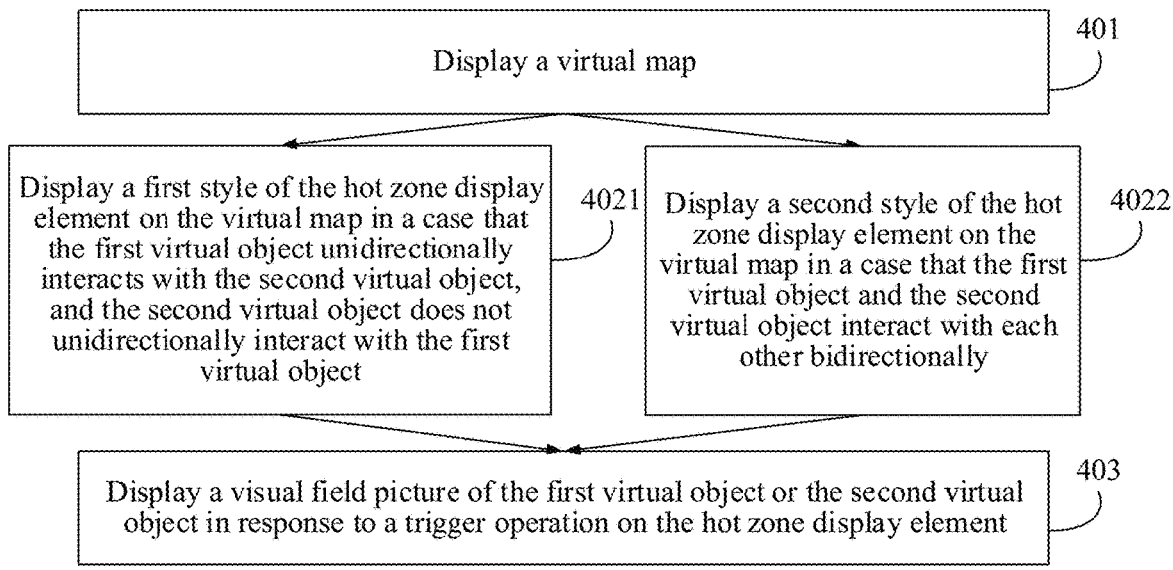
FIG. 6 is a flowchart of a method for displaying a visual field picture provided in an exemplary embodiment of this disclosure.

Based on FIG. 5, FIG. 6 shows a flowchart of a method for displaying a visual field picture provided in an embodiment of this disclosure, and the method is applied to a terminal. In the method, step 402 may be implemented as one of step 4021 and step 4022, and step 4021 and step 4022 are specifically as follows.

Step 4021: Display a first style of the hot zone display element on the virtual map in a case that the first virtual object unidirectionally interacts with the second virtual object, and the second virtual object does not unidirectionally interact with the first virtual object.

Illustratively, the first style of the hot zone display element has unidirectionality, and the unidirectionality means that there is only one pointing direction in the first style of the hot zone display element.

For example, the first style of the hot zone display element is an arrow directing to the identification of the second virtual object from the identification of the first virtual object or an arrow directing to the identification of the first virtual object from the identification of the second virtual object. In another example, the first style of the hot zone display element is a gradient bar, the side of the gradient bar near the identification of the first virtual object has the lowest transparency, and the side near the identification of the second virtual object has the highest transparency. As such, the gradient bar presents a display way in which the identification of the first virtual object directs to the identification of the second virtual object.

According to the foregoing, the interaction of the first virtual object and the second virtual object includes at least one of a discovery interaction, an attack interaction, and a gain interaction. Each interaction includes two unidirectional interactions. The first virtual object unidirectionally interacts with the second virtual object, and the second virtual object does not unidirectionally interact with the first virtual object; the second virtual object unidirectionally interacts with the first virtual object, and the first virtual object does not unidirectionally interact with the second virtual object.

In the embodiments of this disclosure, the only example is taken: the first virtual object unidirectionally interacts with the second virtual object, and the second virtual object does not unidirectionally interact with the first virtual object. It is understood that in a case that the second virtual object unidirectionally interacts with the first virtual object, and the first virtual object does not unidirectionally interact with the second virtual object, the first style of the hot zone display element is also displayed on the virtual map. The specific content may refer to the following, which will not be described in detail.

For example, the first virtual object finds the second virtual object, and the second virtual object does not find the first virtual object. As such, the second virtual object appears in the visual field of the first virtual object, and the first virtual object does not appear in the visual field of the second virtual object. Then the first virtual object unidirectionally interacts with the second virtual object.

In another example, the first virtual object launches an attack on the second virtual object, and the second virtual object does not launch an attack on the first virtual object; or the first virtual object performs a gain behavior on the second virtual object, and the second virtual object does not perform the gain behavior on the first virtual object. Then the first virtual object unidirectionally interacts with the second virtual object.

Illustratively, the first style of the hot zone display element has unidirectionality.

The first style of the hot zone display element directs to a virtual object who performs the unidirectional interaction first of the first virtual object and the second virtual object. Alternatively, the first style of the hot zone display element is at least one of the following styles: gradient bars, arrows, and irregular polygons. For example, the first style of the hot zone display element is an arrow directing to the identification of another virtual object by the identification of the virtual object who performs the unidirectional interaction first. For example, in the first virtual object and the second virtual object, the first virtual object performs the unidirectional interaction first, and then the first style of the hot zone display element is an arrow directing to the second object identification by the first object identification; in the first virtual object and the second virtual object, the second virtual object performs the unidirectional interaction first, and then the first style of the hot zone display element is an arrow directing to the first object identification by the second object identification.

Alternatively, to display the unidirectionality of the first style of the hot zone display element, displaying the first style of the hot zone display element on the virtual map may be implemented as:

displaying the first style of the hot zone display element between the identification of the first virtual object and the identification of the second virtual object, one end of the first style of the hot zone display element starting from the identification of the first virtual object, and the other end of the first style of the hot zone display element directing to the identification of the second virtual object.

The display area of the first style of the hot zone display element is a partial map area between the identification of the first virtual object and the identification of the second virtual object.

Alternatively, taking the display style of the first style of the hot zone display element being a gradient bar as an example, displaying the first style of the hot zone display element between the identification of the first virtual object and the identification of the second virtual object may be implemented as:

displaying a first gradient bar between the identification of the first virtual object and the identification of the second virtual object, transparency of the first gradient bar gradually increasing from one end near the identification of the first virtual object to the other end near the identification of the second virtual object.

Figure 7:
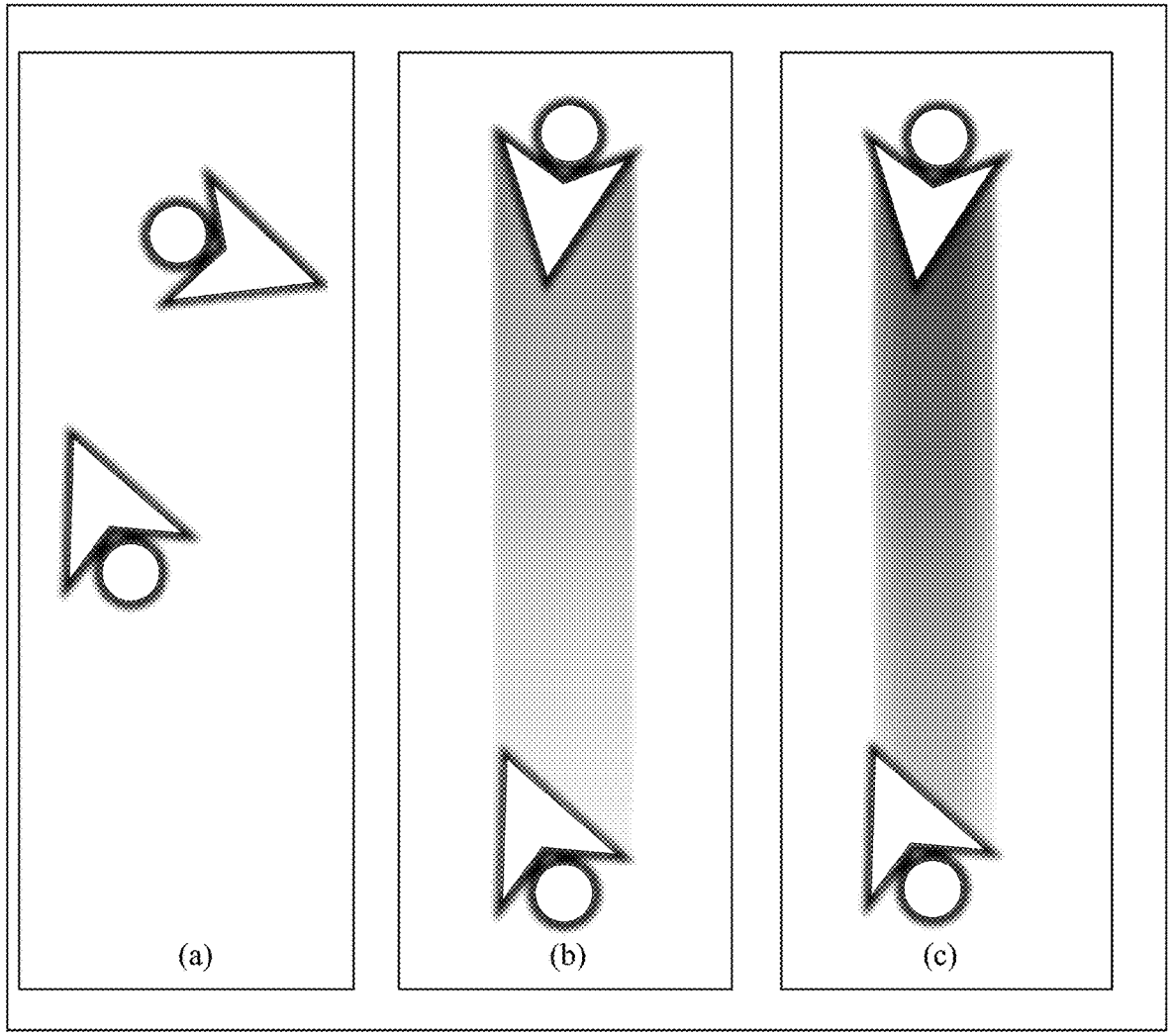
FIG. 7 is a schematic illustration of a display identification provided in an exemplary embodiment of this disclosure.

FIG. 7 shows a schematic illustration of a display identification provided in an exemplary embodiment of this disclosure. (a) of FIG. 7 shows the identification of the first virtual object and the identification of the second virtual object; (b) and (c) of FIG. 7 show two different first gradient bars having different color depths.

The transparency of the first gradient bar is determined according to the difference of the virtual object who performs the unidirectional interaction first of the first virtual object and the second virtual object.

Taking the virtual object who performs the unidirectional interaction first being the first virtual object as an example, the end of the first gradient bar near the identification of the first virtual object has the lowest transparency, and the end near the identification of the second virtual object has the highest transparency For example, the end of the first gradient bar near the identification of the first virtual object has a transparency of 0%, and the end near the identification of the second virtual object has a transparency of 80%-100%.

Step 4022: Display a second style of the hot zone display element on the virtual map in a case that the first virtual object and the second virtual object interact with each other bidirectionally.

According to the foregoing, the interaction of the first virtual object and the second virtual object includes at least one of a discovery interaction, an attack interaction, and a gain interaction. Each interaction includes the bidirectional interaction. The first virtual object and the second virtual object appear in the visual field of the other party; the first virtual object and the second virtual object attack each other; the first virtual object and the second virtual object perform a gain behavior on the other party.

Illustratively, the second style of the hot zone display element has bidirectionality, and the bidirectionality means that there are two pointing directions in the second style of the hot zone display element.

For example, the second style of the hot zone display element is an arrow separately directing to the identification of the first virtual object and the identification of the second virtual object from the midpoint of a straight line between the identification of the first virtual object and the identification of the second virtual object. In another example, the second style of the hot zone display element is a gradient bar, the side of the gradient bar near the identification of the first virtual object and the side near the identification of the second virtual object have the lowest transparency, and the middle position of the gradient bar has the highest transparency. As such, the gradient bar presents a display way of simultaneously directing to the identification of the first virtual object and the identification of the second virtual object.

The second style of the hot zone display element directs to the identification of the first virtual object and the identification of the second virtual object, which indicates that both the first virtual object and the second virtual object act on the other party. Alternatively, the second style of the hot zone display element is at least one of the following styles: gradient bars, arrows, and irregular polygons. For example, the second style of the hot zone display element is an arrow simultaneously directing to the middle from the identification of the first virtual object and the identification of the second virtual object.

Alternatively, to display the bidirectionality of the second style of the hot zone display element, displaying the second style of the hot zone display element on the virtual map may be implemented as:

displaying the second style of the hot zone display element between the identification of the first virtual object and the identification of the second virtual object, two ends of the second style of the hot zone display element separately starting from the identification of the first virtual object and the identification of the second virtual object to direct to each other.

The display area of the second style of the hot zone display element is a partial map area between the identification of the first virtual object and the identification of the second virtual object.

Alternatively, taking the display style of the second style of the hot zone display element being a gradient bar as an example, displaying the second style of the hot zone display element between the first virtual object and the second virtual object includes:

displaying a second gradient bar between the identification of the first virtual object and the identification of the second virtual object, transparency of the second gradient bar gradually increasing from the two ends to a middle.

Illustratively, the transparency of the second gradient bar is determined according to the relative positional relationship of the first virtual object and the second virtual object.

The end of the second gradient bar near the identification of the first virtual object and the end near the identification of the second virtual object have the lowest transparency, and the middle position of the second gradient bar has the highest transparency. For example, the end of the second gradient bar near the identification of the first virtual object has a transparency of 0%, the end near the identification of the second virtual object has a transparency of 0%, and the middle position of the second gradient bar has a transparency of 80%-100%.

Illustratively, step 4021 and step 4022 are performed alternatively, but not simultaneously.

In summary, in the method for displaying a visual field picture provided in the embodiments of this disclosure, two different styles of hot zone display elements are provided according to the difference between the unidirectional interaction and the bidirectional interaction of the first virtual object and the second virtual object.

The first style of the hot zone display element has unidirectionality for directing to a virtual object who performs the unidirectional interaction first of the first virtual object and the second virtual object; the second style of the hot zone display element has bidirectionality for indicating the bidirectional interaction of the first virtual object and the second virtual object.

For example, the display style of the hot zone display element is a gradient bar. The first style of the hot zone display element is a first gradient bar, and the transparency of the first gradient bar gradually increases from one end near the identification of the first virtual object to the other end near the identification of the second virtual object; the second style of the hot zone display element is a second gradient bar, and the transparency of the second gradient bar gradually increases from the two ends to a middle.

In addition, according to the foregoing, the interaction between the first virtual object and the second virtual object may further include at least one of a discovery interaction, an attack interaction, and a gain interaction. The contents of the hot zone display elements are different according to the different interactions between the first virtual object and the second virtual object.

Illustratively, the hot zone display element includes at least one of the following:

a first hot zone display element for indicating that the first virtual object and/or the second virtual object appears in a visual field of the other party;

a second hot zone display element for indicating that the first virtual object and/or the second virtual object launches an attack on the other party; and a third hot zone display element for indicating a gain interaction of the first virtual object and the second virtual object, the gain interaction being an interaction to increase an attribute value of the first virtual object and/or the second virtual object.

The related explanations of the first hot zone display element, the second hot zone display element, and the third hot zone display element may refer to the foregoing, which will not be described in detail.

Alternatively, the first hot zone display element, the second hot zone display element, and the third hot zone display element have different display priorities. Based on FIG. 4, step 402 may be implemented as: displaying a hot zone display element with the highest display priority between the identification of the first virtual object and the identification of the second virtual object.

For example, the display priority of the second hot zone display element is higher than that of the first hot zone display element. In a case that the first virtual object finds the second virtual object, and the first virtual object launches an attack on the second virtual object, then the second hot zone display element is displayed between the identification of the first virtual object and the identification of the second virtual object.

In another example, the display priority of the third hot zone display element is higher than that of the first hot zone display element. In a case that the first virtual object finds the second virtual object, and the first virtual object performs a gain behavior on the second virtual object, then the third hot zone display element is displayed between the identification of the first virtual object and the identification of the second virtual object.

Figure 9:
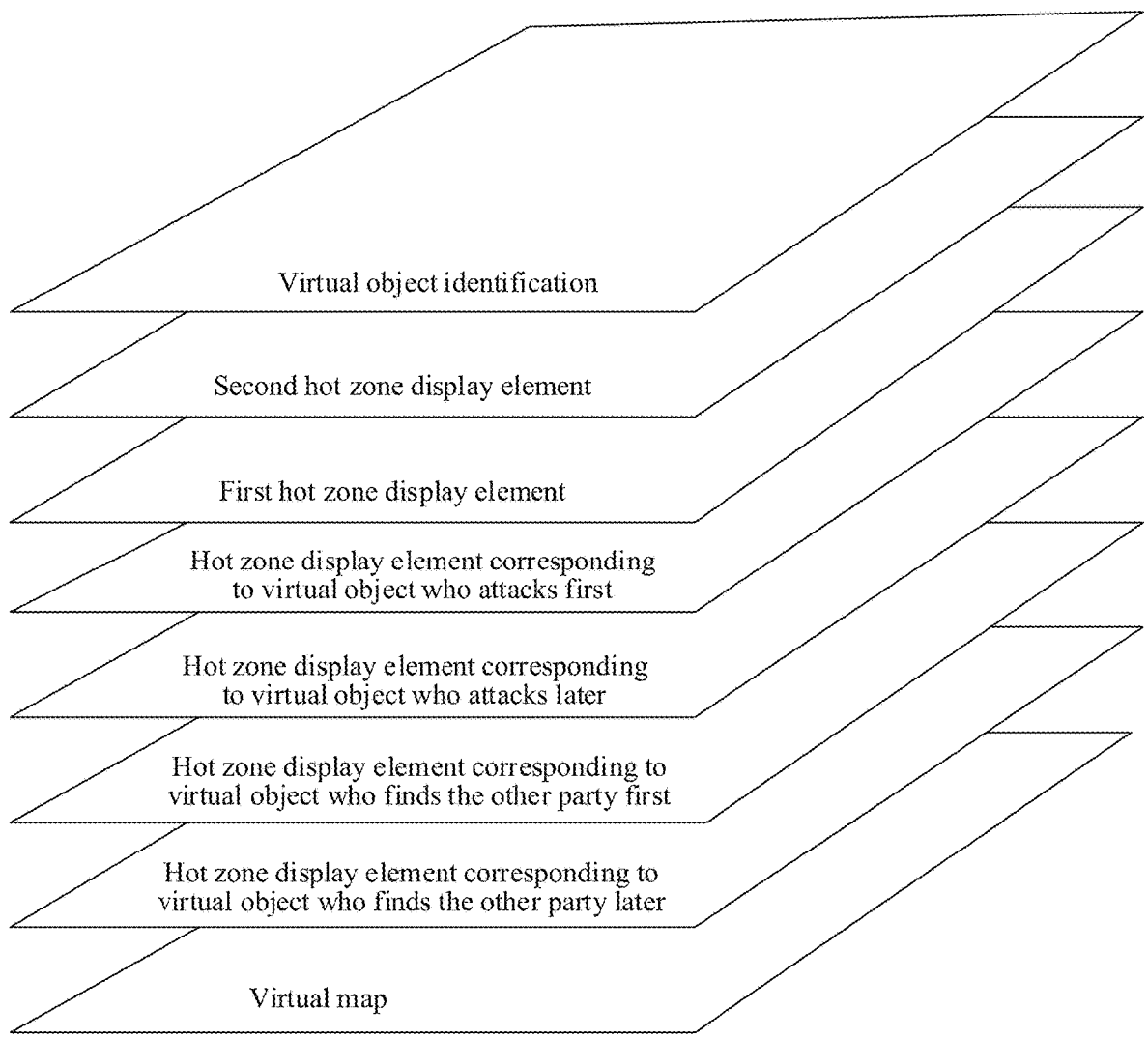
FIG. 9 is a schematic illustration of a display priority provided in an exemplary embodiment of this disclosure.

FIG. 9 shows a schematic illustration of a display priority provided in an exemplary embodiment of this disclosure.

For example, the identification of the first virtual object and the identification of the second virtual object are displayed on the virtual map. The identifications of the virtual objects have the highest display priority, and the virtual map has the lowest display priority. The display priority successively decreases from top to bottom, and a level with a higher display priority will cover a level with a lower display priority.

For example, the hot zone display element includes the first hot zone display element and the second hot zone display element, and the display priority of the second hot zone display element is higher than that of the first hot zone display element. The display levels in the display interface are arranged in the order of the identifications, the second hot zone display element, the first hot zone display element, and the virtual map from top to bottom.

Alternatively, the display priority of a hot zone display element corresponding to a virtual object who performs the unidirectional action first is higher than that of a hot zone display element corresponding to a virtual object who performs the unidirectional action later.

For example, the display priority of a hot zone display element corresponding to a virtual object who launches an attack first is higher than that of a hot zone display element corresponding to a virtual object who launches an attack later. In another example, the display priority of a hot zone display element corresponding to a virtual object who finds the other party first is higher than that of a hot zone display element corresponding to a virtual object who finds the other party later.

In displaying the visual field picture of the first virtual object or the second virtual object, a party who performs the unidirectional interaction first of the first virtual object and the second virtual object is determined and the visual field picture corresponding to the party is displayed. If the first virtual object and the second virtual object interact with each other at the same time, then the visual field picture corresponding to the first virtual object or the second virtual object is displayed at random, or the visual field picture corresponding to the first virtual object or the second virtual object with a smaller distance is displayed by separately determining a distance between a trigger position of a trigger operation on the hot zone display element and a display position of the first object identification and a distance between a trigger position of a trigger operation on the hot zone display element and a display position of the second object identification.

Alternatively, the display widths of the first hot zone display element and the second hot zone display element are identical. In a case that the first hot zone display element and the second hot zone display element are simultaneously present, the second hot zone display element completely covers the first hot zone display element.

For example, in a case that the first virtual object finds the second virtual object, and the first virtual object launches an attack on the second virtual object, then the second hot zone display element is displayed between the first object identification and the second object identification, and the first hot zone display element is completely covered by the second hot zone display element.

Subsequently, the displaying the hot zone display element is canceled in a case that a distance between the first virtual object and the second virtual object exceeds a preset value. At this time, the first hot zone display element may be displayed between the first object identification and the second object identification.

Figure 8:
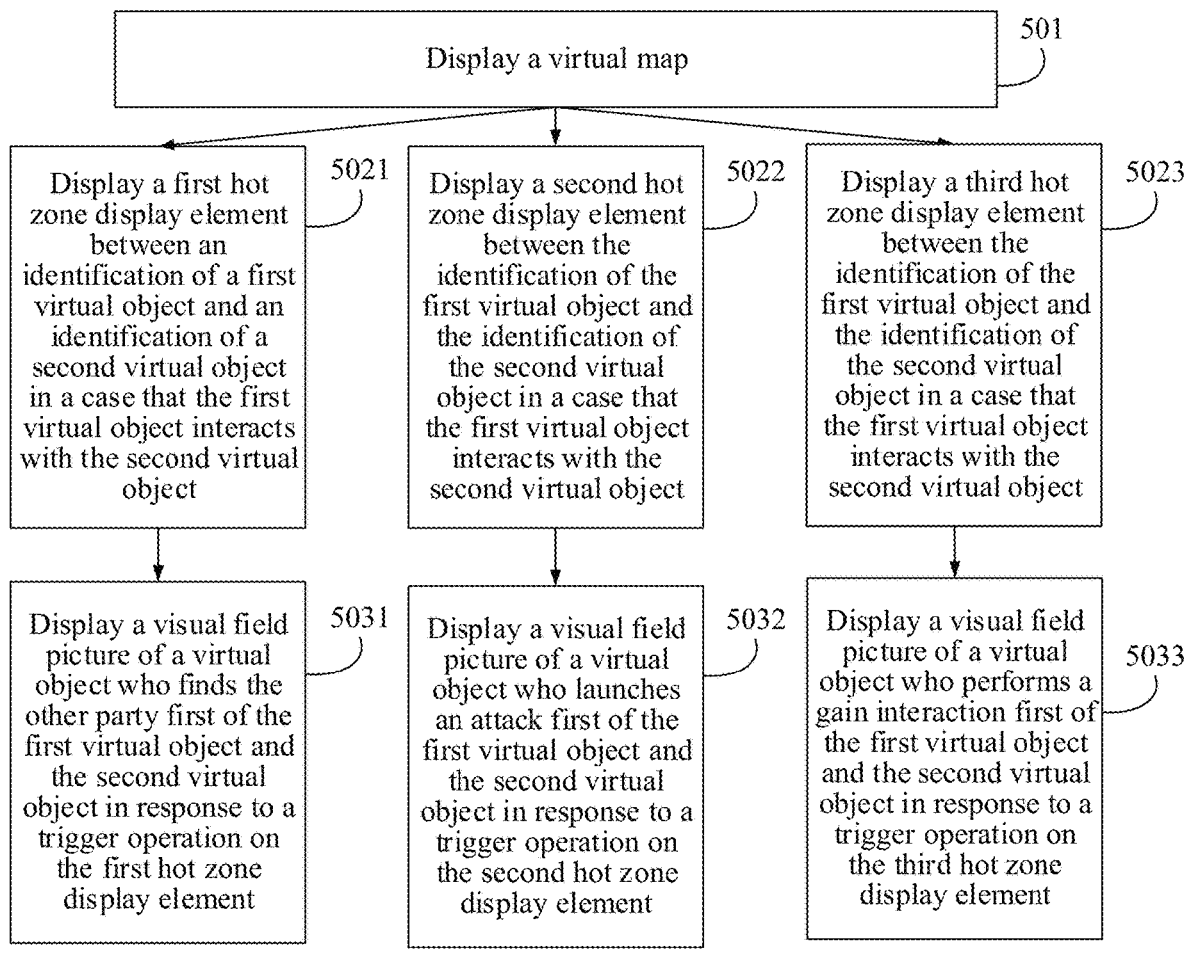
FIG. 8 is a flowchart of a method for displaying a visual field picture provided in an exemplary embodiment of this disclosure.

For example, the hot zone display element includes at least one of the first hot zone display element, the second hot zone display element, and the third hot zone display element. FIG. 8 shows a flowchart of a method for displaying a visual field picture provided in an embodiment of this disclosure, and the method is applied to a terminal. The displayed visual field pictures are different according to the different contents indicated by the hot zone display elements. The method includes the following steps.

Step 501: Display a virtual map.

Illustratively, the virtual map displays an identification of a first virtual object and an identification of a second virtual object.

The first virtual object and the second virtual object belong to the same camp or different camps. If the first virtual object and the second virtual object belong to the same camp, the two are teammates; if the first virtual object and the second virtual object belong to different camps, the two are antagonists.

Illustratively, the identification is used for indicating at least one of the positions, the moving directions, and the visual field directions of the first virtual object or the second virtual object on the virtual map.

The relative distance of the first object identification and the second object identification on the virtual map is shortened, and the two identifications are gradually close to each other in a case that the first virtual object interacts with the second virtual object.

Illustratively, step 501 is the same as step 401 that may be for reference without further explanation.

According to the foregoing, the hot zone display element includes at least one of the first hot zone display element, the second hot zone display element, and the third hot zone display element. Illustratively, in a case that the hot zone display element includes the first hot zone display element, step 5021 and step 5031 are performed; in a case that the hot zone display element includes the second hot zone display element, step 5022 and step 5032 are performed; in a case that the hot zone display element includes the third hot zone display element, step 5023 and step 5033 are performed. The three sets of steps composed of step 5021 and step 5031, step 5022 and step 5032, and step 5023 and step 5033 may be performed alternatively or simultaneously. Alternatively, in the case of simultaneous performing, the display is performed according to the display priorities of the different hot zone display elements, and a hot zone display element with a higher display priority completely covers a hot zone display element with a lower display priority.

Step 5021: Display a first hot zone display element between an identification of a first virtual object and an identification of a second virtual object in a case that the first virtual object interacts with the second virtual object.

The first hot zone display element is used for indicating that the first virtual object and/or the second virtual object appears in a visual field of the other party.

For example, a first style of the first hot zone display element is displayed between the first object identification and the second object identification in a case that the second virtual object appears in the visual field of the first virtual object, and the first virtual object does not appear in the visual field of the second virtual object. In another example, a second style of the first hot zone display element is displayed between the first object identification and the second object identification in a case that the first virtual object and the second virtual object appear in visual field of the other party.

Figure 10:
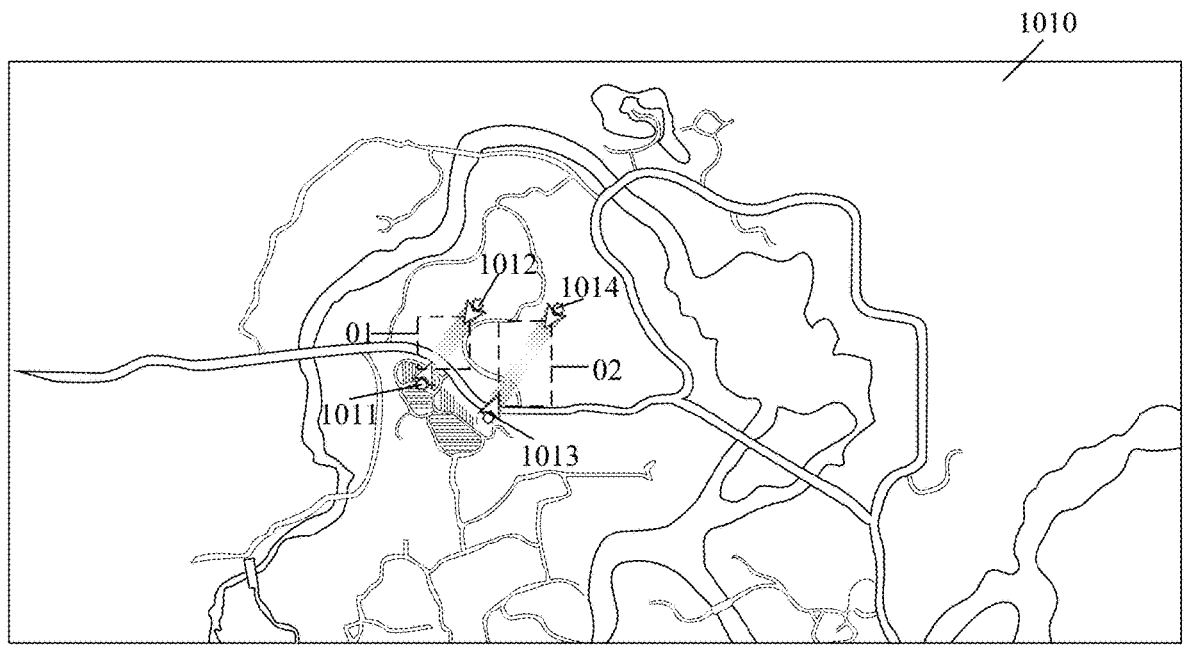
FIG. 10 is a schematic illustration of an interface when an interaction occurs provided in an exemplary embodiment of this disclosure.

FIG. 10 shows a schematic illustration of an interface when an interaction occurs provided in an exemplary embodiment of this disclosure.

Four identifications of the virtual objects are displayed on a virtual map 1010: a first object identification 1011, a second object identification 1012, a third object identification 1013, and a fourth object identification 1014. The first object identification 1011 and the second object identification 1012 belong to the same camp; the third object identification 1013 and the fourth object identification 1014 belong to different camps.

According to the foregoing, the hot zone display element includes any one of the first style and the second style.

Referring to FIG. 10, a first style of a first hot zone display element 01 is displayed between the first object identification 1011 and the second object identification 1012 to indicate that the virtual object corresponding to the second object identification 1012 finds the virtual object corresponding to the first object identification 1011, and the virtual object corresponding to the first object identification 1011 does not find the virtual object corresponding to the second object identification 1012.

Alternatively, the first style is a first gradient bar, and the transparency of the first gradient bar gradually increases from one end near the second object identification 1012 to the other end near the first object identification 1011.

For example, the first gradient bar is a yellow gradient bar. The first style of the yellow gradient bar is displayed between the first object identification 1011 and the second object identification 1012 in a case that the virtual object corresponding to the first object identification 1011 appears in the visual field of the virtual object corresponding to the second object identification 1012. The yellow gradient bar is used for indicating that the virtual object corresponding to the second object identification 1012 finds the virtual object corresponding to the first object identification 1011, and the virtual object corresponding to the first object identification 1011 does not find the virtual object corresponding to the second object identification 1012.

Alternatively, the color of the end of the yellow gradient bar near the second object identification 1012 is FBE627 100%, and the color of the other end near the first object identification 1011 is FBE627 10%.

Similarly, referring to FIG. 10, a second style of a first hot zone display element 02 is displayed between the third object identification 1013 and the fourth object identification 1014 to indicate that the virtual object corresponding to the third object identification 1013 and the virtual object corresponding to the fourth object identification 1014 find each other.

Alternatively, the second style is a second gradient bar, and the transparency of the second gradient bar gradually increases from the two ends to a middle.

For example, the second gradient bar is a yellow gradient bar. The first style of the yellow gradient bar is displayed between the first object identification 1011 and the second object identification 1012 in a case that the virtual object corresponding to the first object identification 1011 appears in the visual field of the virtual object corresponding to the second object identification 1012. The transparency of the yellow gradient bar gradually increases from one end near the second object identification 1012 to the other end near the first object identification 1011.

When the virtual object corresponding to the first object identification 1011 finds the virtual object corresponding to the second object identification 1012, the transparency of the other end of the yellow gradient bar near the first object identification 1011 decreases until the transparency is the same as the transparency of one end near the second object identification 1012, and the transparency of the middle position of the yellow gradient bar reaches the highest. Then the second style of the yellow gradient bar is formed.

Step 5031: Display a visual field picture of a virtual object who finds the other party first of the first virtual object and the second virtual object in response to a trigger operation on the first hot zone display element.

The trigger operation on the first hot zone display element includes, but is not limited to at least one of the following: one-click operation on the first hot zone display element, a double-click operation on the first hot zone display element, a touch operation on the first hot zone display element, and a sliding operation on the first hot zone display element.

For example, the first virtual object finds the second virtual object, and the second virtual object does not find the first virtual object. The first virtual object is close to and interacts with the second virtual object, and the first hot zone display element is displayed on the virtual map.

The second virtual object appears in the visual field of the first virtual object, and the first virtual object does not appear in the visual field of the second virtual object. Subsequently, the visual field of the first virtual object is displayed in response to the trigger operation on the hot zone display element, and the second virtual object or the identification of the second virtual object is displayed in the visual field.

In another example, the first virtual object and the second virtual object find and attack each other, and the second virtual object finds and attacks the first virtual object first. The first virtual object is close to and interact with the second virtual object, and the first hot zone display element is displayed on the virtual map.

The second virtual object finds the first virtual object and launches an attack on the first virtual object first, and the first virtual object launches an attack on the second virtual object after receiving the attack. Subsequently, the visual field of the second virtual object is displayed in response to the trigger operation on the hot zone display element, and the first virtual object or the identification of the first virtual object is displayed in the visual field.

Illustratively, step 5031 is similar to step 403 that may be for reference without further explanation.

Step 5022: Display a second hot zone display element between the identification of the first virtual object and the identification of the second virtual object in a case that the first virtual object interacts with the second virtual object.

The second hot zone display element is used for indicating that the first virtual object and/or the second virtual object launches an attack on the other party.

For example, a first style of the second hot zone display element is displayed between the first object identification and the second object identification in a case that the first virtual object launches an attack on the second virtual object, and the second virtual object does not launch an attack on the first virtual object. In another example, a second style of the second hot zone display element is displayed between the first object identification and the second object identification in a case that the first virtual object and the second virtual object attack each other.

Figure 11:
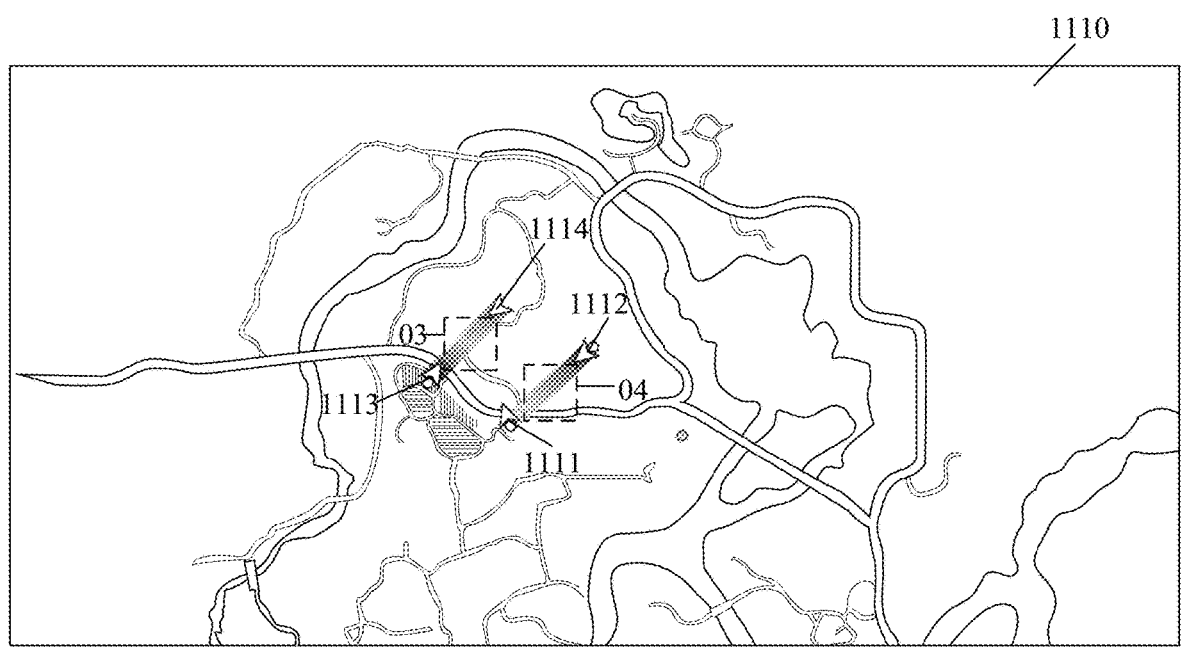
FIG. 11 is a schematic illustration of an interface when an interaction occurs provided in an exemplary embodiment of this disclosure.

FIG. 11 shows a schematic illustration of an interface when an interaction occurs provided in an exemplary embodiment of this disclosure.

Four identifications of the virtual objects are displayed on a virtual map 1110: a first object identification 1111, a second object identification 1112, a third object identification 1113, and a fourth object identification 1114. The first object identification 1111 and the second object identification 1112 belong to different camps; the third object identification 1113 and the fourth object identification 1114 belong to different camps.

According to the foregoing, the hot zone display element includes any one of the first style and the second style.

Referring to FIG. 11, a first style of a second hot zone display element 04 is displayed between the first object identification 1111 and the second object identification 1112 to indicate that the virtual object corresponding to the second object identification 1112 launches an attack on the virtual object corresponding to the first object identification 1111, and the virtual object corresponding to the first object identification 1111 does not launch an attack on the virtual object corresponding to the second object identification 1112.

Alternatively, the first style is a first gradient bar, and the transparency of the first gradient bar gradually increases from one end near the second object identification 1112 to the other end near the first object identification 1111.

For example, the first gradient bar is a red gradient bar. The first style of the red gradient bar is displayed between the first object identification 1111 and the second object identification 1112 in a case that the virtual object corresponding to the second object identification 1112 launches an attack on the virtual object corresponding to the first object identification 1111. The red gradient bar is used for indicating that the virtual object corresponding to the second object identification 1112 launches an attack on the virtual object corresponding to the first object identification 1111, and the virtual object corresponding to the first object identification 1111 does not launch an attack on the virtual object corresponding to the second object identification 1112.

Similarly, referring to FIG. 11, a second style of a second hot zone display element 03 is displayed between the third object identification 1113 and the fourth object identification 1114 to indicate that the virtual object corresponding to the third object identification 1113 and the virtual object corresponding to the fourth object identification 1114 attack each other.

Alternatively, the second style is a second gradient bar, and the transparency of the second gradient bar gradually increases from the two ends to a middle.

For example, the second gradient bar is a red gradient bar. The first style of the red gradient bar is displayed between the first object identification 1111 and the second object identification 1112 in a case that the virtual object corresponding to the first object identification 1111 launches an attack on the virtual object corresponding to the second object identification 1112. The transparency of the red gradient bar gradually increases from one end near the first object identification 1111 to the other end near the second object identification 1112.

When the virtual object corresponding to the second object identification 1112 launches an attack on the virtual object corresponding to the first object identification 1111, the transparency of the other end of the red gradient bar near the second object identification 1112 decreases until the transparency is the same as the transparency of one end near the first object identification 1111, and the transparency of the middle position of the red gradient bar reaches the highest. Then the second style of the red gradient bar is formed.

Step 5032: Display a visual field picture of a virtual object who launches an attack first of the first virtual object and the second virtual object in response to a trigger operation on the second hot zone display element.

The trigger operation on the second hot zone display element includes, but is not limited to at least one of the following: one-click operation on the second hot zone display element, a double-click operation on the second hot zone display element, a touch operation on the second hot zone display element, and a sliding operation on the second hot zone display element.

For example, the first virtual object and the second virtual object attack each other, and the second virtual object launches an attack on the first virtual object first. The first virtual object is close to and interacts with the second virtual object, and the second hot zone display element is displayed on the virtual map.

The second virtual object finds the first virtual object and launches an attack on the first virtual object first, and the first virtual object launches an attack on the second virtual object after receiving the attack. Subsequently, the visual field of the second virtual object is displayed in response to the trigger operation on the second hot zone display element, and the first virtual object or the identification of the first virtual object is displayed in the visual field.

Illustratively, step 5032 is similar to step 403 that may be for reference without further explanation.

Step 5023: Display a third hot zone display element between the identification of the first virtual object and the identification of the second virtual object in a case that the first virtual object interacts with the second virtual object.

The third hot zone display element is used for indicating a gain interaction of the first virtual object and the second virtual object, the gain interaction being an interaction to increase an attribute value of the first virtual object and/or the second virtual object.

For example, a first style of the third hot zone display element is displayed between the identification of the first virtual object and the identification of the second virtual object in a case that the first virtual object performs a gain behavior on the second virtual object, and the second virtual object does not perform a gain behavior on the first virtual object. In another example, a second style of the third hot zone display element is displayed between the identification of the first virtual object and the identification of the second virtual object in a case that the first virtual object and the second virtual object perform a gain behavior on each other.

The gain behavior includes at least one of a behavior of directly increasing an attribute value and a behavior of indirectly increasing the attribute value. For example, the behavior of increasing the health point by releasing a treatment skill may be regarded as the behavior of directly increasing the attribute value, and the behavior of increasing the battle value by exchanging virtual items may be regarded as the behavior of indirectly increasing the attribute value.

Illustratively, step 5023 is similar to step 5021 and step 5022 that may be for reference without further explanation.

Step 5033: Display a visual field picture of a virtual object who performs a gain behavior first of the first virtual object and the second virtual object in response to a trigger operation on the third hot zone display element.

The trigger operation on the third hot zone display element includes, but is not limited to at least one of the following: one-click operation on the third hot zone display element, a double-click operation on the third hot zone display element, a touch operation on the third hot zone display element, and a sliding operation on the third hot zone display element.

For example, the first virtual object performs a gain behavior on the second virtual object, and the second virtual object does not perform a gain behavior on the first virtual object. The first virtual object is close to and interacts with the second virtual object, and the third hot zone display element is displayed on the virtual map.

Subsequently, the visual field of the first virtual object is displayed in response to the trigger operation on the third hot zone display element, and the identification of the second virtual object is displayed in the visual field.

Illustratively, step 5033 is similar to step 403 that may be for reference without further explanation.

In summary, in the method for displaying a visual field picture provided in the embodiments of this disclosure, the contents of the hot zone display elements are different according to the different interactions between the first virtual object and the second virtual object. For example, the hot zone display element includes at least one of the first hot zone display element, the second hot zone display element, and the third hot zone display element. In response to different hot zone display elements, the displayed visual field pictures are also different.

In addition, the first hot zone display element, the second hot zone display element and the third hot zone display element have different display priorities. The corresponding displays can be performed based on different display priorities so as to acquire an interaction with a higher priority as soon as possible.

Figure 12:
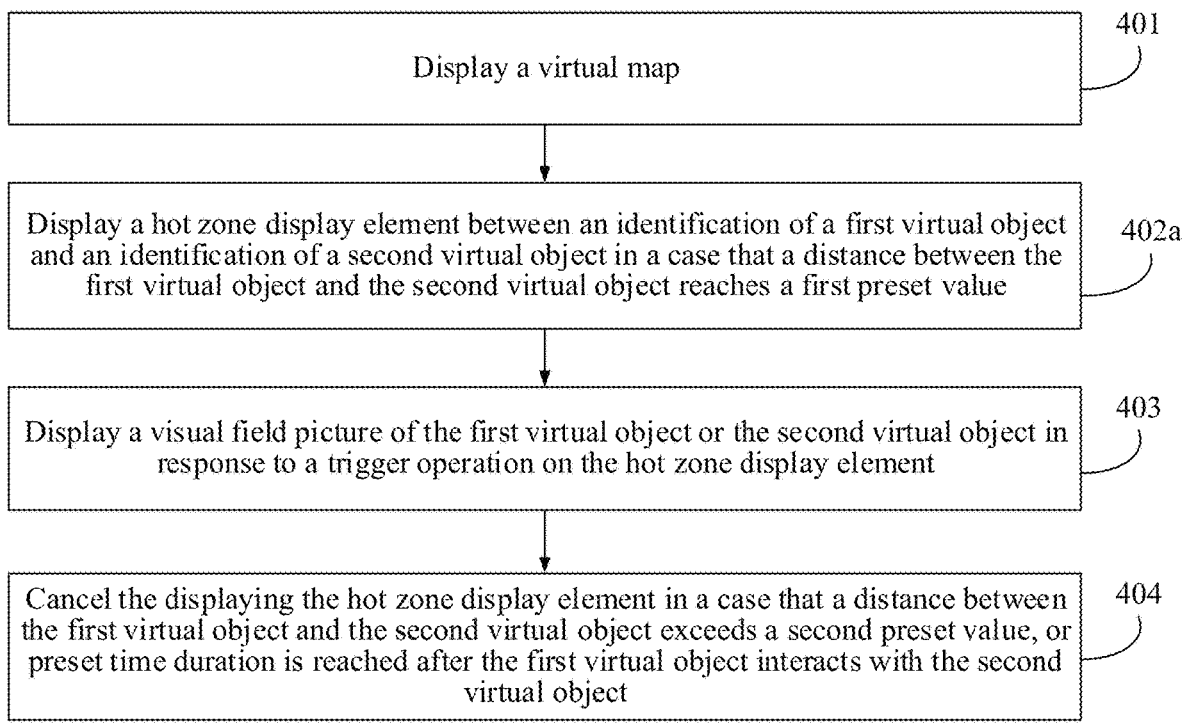
FIG. 12 is a flowchart of a method for displaying a visual field picture provided in an exemplary embodiment of this disclosure.

Based on FIG. 4, FIG. 12 shows a flowchart of a method for displaying a visual field picture provided in an embodiment of this disclosure, and the method is applied to a terminal. Step 402 may be implemented as step 402*a*. Alternatively, the method for displaying a visual field picture provided in an embodiment of this disclosure further includes step 404. Step 402*a* and step 404 are as follows.

Step 402*a*: Display a hot zone display element between an identification of a first virtual object and an identification of a second virtual object in a case that a distance between the first virtual object and the second virtual object reaches a first preset value.

The first preset value can be set according to actual needs, which is not limited in this disclosure.

According to the foregoing, the hot zone display element includes at least one of the first hot zone display element, the second hot zone display element, and the third hot zone display element. According to different hot zone display elements, step 402*a* may be implemented as at least one of the following three:

1. In a case that the hot zone display element includes the first hot zone display element:

displaying the first hot zone display element between the identification of the first virtual object and the identification of the second virtual object in a case that the second virtual object appears in the visual field of the first virtual object, and there is no virtual barrier between character models corresponding to the first virtual object and the second virtual object; or displaying the first hot zone display element between the identification of the first virtual object and the identification of the second virtual object in a case that the first virtual object and the second virtual object appear in each other's visual field, and there is no virtual barrier between the character models corresponding to the first virtual object and the second virtual object.

2. In a case that the hot zone display element includes the second hot zone display element:

displaying the second hot zone display element between the identification of the first virtual object and the identification of the second virtual object in a case that the second virtual object is a virtual object closest to the aiming center of the first virtual object in the visual field range of the first virtual object, and the first virtual object launches an attack on the second virtual object; or displaying the second hot zone display element between the identification of the first virtual object and the identification of the second virtual object in a case that the second virtual object is a virtual object closest to the aiming center of the first virtual object in the visual field range of the first virtual object, and the first virtual object and the second virtual object attack each other.

3. In a case that the hot zone display element includes the third hot zone display element:

displaying the third hot zone display element between the identification of the first virtual object and the identification of the second virtual object in a case that the first virtual object performs a gain behavior on the second virtual object, and there is no virtual barrier between the character models corresponding to the first virtual object and the second virtual object; or displaying the third hot zone display element between the identification of the first virtual object and the identification of the second virtual object in a case that the first virtual object and the second virtual object perform a gain behavior on each other, and there is no virtual barrier between the character models corresponding to the first virtual object and the second virtual object; or Step 404: Cancel the displaying the hot zone display element in a case that a distance between the first virtual object and the second virtual object exceeds a second preset value, or preset time duration is reached after the first virtual object interacts with the second virtual object.

The second preset value and the preset time duration can be set according to actual needs, which are not limited in this disclosure.

For example, the preset time duration is 3 seconds, and the display style of the hot zone display element is a gradient bar. The displaying of the gradient bar is canceled in a case that 3 seconds is reached after the first virtual object launches an attack on the second virtual object, or the second virtual object does not appear in the visual field of the first virtual object.

In summary, in the method for displaying a visual field picture provided in the embodiments of this disclosure, the conditions for displaying and canceling the displaying the hot zone display element are given. The hot zone display element is displayed in a case that the distance between the first virtual object and the second virtual object reaches the first preset value. The displaying the hot zone display element is canceled in a case that the distance between the first virtual object and the second virtual object exceeds the second preset value, or the preset time duration is reached after the first virtual object interacts with the second virtual object.

It is understood that the various embodiments described above may be used in any combination.

For example, the first virtual object is close to the second virtual object, and the first virtual object and the second virtual object perform the discovery interaction. For example, the second virtual object appears in the visual field of the first virtual object. In a case that the first virtual object does not appear in the visual field of the second virtual object, the first style of the hot zone display element is displayed between the first virtual object and the second virtual object, and the display style thereof is a yellow gradient bar. One side of the yellow gradient bar towards the first virtual object has the lowest transparency, and the other side towards the second virtual object has the highest transparency.

Subsequently, in a case that the first virtual object also appears in the visual field of the second virtual object, the second style of the hot zone display element is displayed between the first virtual object and the second virtual object, and the display style thereof is still a yellow gradient bar. One side of the yellow gradient bar towards the first virtual object and the other side towards the second virtual object have the lowest transparency, and the middle position of the yellow gradient bar has the highest transparency.

Illustratively, other combinations of the various embodiments described above are similar thereto, which will not be described in detail.

Figure 13:
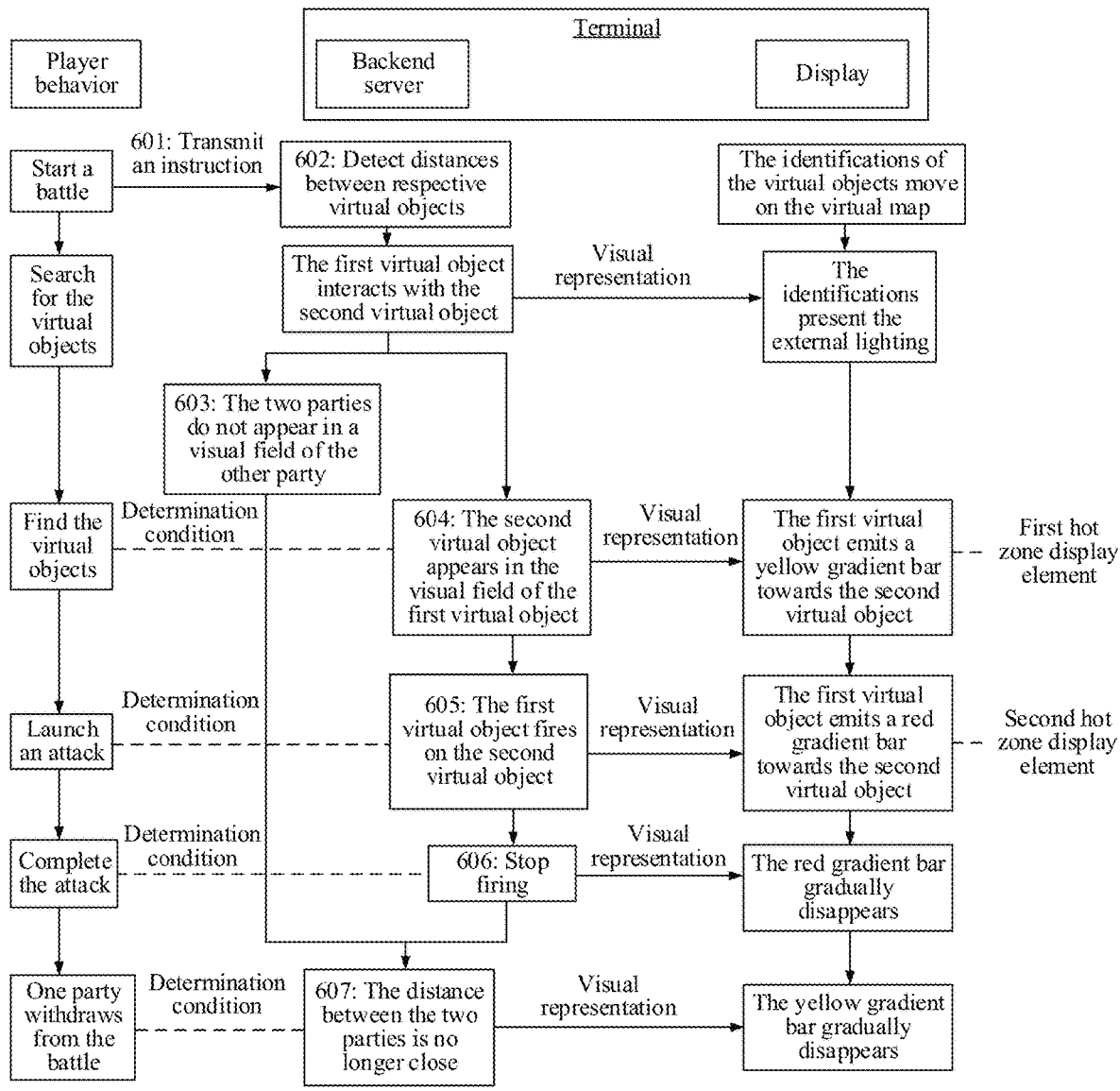
FIG. 13 is a flowchart of a method for displaying a visual field picture provided in an exemplary embodiment of this disclosure.

FIG. 13 shows a flowchart of a method for displaying a visual field picture provided in an embodiment of this disclosure, and the method is applied to a terminal. The terminal includes a backend server and a display. The backend server executes the following steps according to the in-match behavior of the player in the battle match, and the display is configured to present different display contents on the virtual map displayed in the display interface of the terminal based on different execution steps.

Illustratively, for example, the hot zone display element includes the first hot zone display element and the second hot zone display element. The method for displaying a visual field picture provided in the embodiments of this disclosure includes the following steps.

Step 601: A game application program transmits an instruction to a backend server.

Illustratively, the instruction is used for instructing the backend server to detect distances between respective virtual objects.

After acquiring different distances between the respective virtual objects, the backend server may determine the interaction conditions between the respective virtual objects.

According to the foregoing, for example, the identification of the first virtual object and the identification of the second virtual object are displayed on the virtual map. The interaction of the first virtual object and the second virtual object includes at least one of a discovery interaction, an attack interaction, and a gain interaction.

In the embodiments of this disclosure, for example, the first virtual object and the second virtual object belong to different camps. The interaction between the first virtual object and the second virtual object includes the discovery interaction and the attack interaction.

After starting a battle, the game application transmits the instruction to the backend server for instructing the backend server to detect the distances between the respective virtual objects. At the same time, the backend server controls the display to display that the identifications of the virtual objects move on the virtual map.

Step 602: The backend server detects distances between respective virtual objects.

As the respective virtual objects begins to move, the distances between the character models of the respective virtual object change. Illustratively, in a case that the first virtual object interacts with the second virtual object, the backend server controls the display to display that the identifications of the virtual objects present the external lighting on the virtual map.

Subsequently, the backend server detects the distance between the first virtual object and the second virtual object, performs step 603 when the first preset value is not satisfied, and performs step 604 when the first preset value is satisfied. Step 603 and step 604 are as follows.

Step 603: Perform step 607 in a case that neither a first virtual object nor a second virtual object appears in a visual field of the other party.

In the process of performing step 607 after performing step 603, if the first hot zone display element corresponding to the first virtual object and other virtual objects does not appear, the step of canceling the first hot zone display element in step 607 is not performed.

Step 604: The backend server controls a display to display a first hot zone display element on a virtual map in a case that the second virtual object appears in the visual field of the first virtual object.

The first virtual object does not appear in the visual field of the second virtual object.

Alternatively, a visual representation of the first hot zone display element is that the first virtual object emits a yellow gradient bar towards the second virtual object.

The backend server controls the display to display the first hot zone display element on the virtual map in a case that there is no barrier between the character models of the first virtual object and the second virtual object after the shot of the first virtual object detects that the second virtual object appears in the attack range.

The display style of the first hot zone display element is a yellow gradient bar that is emitted to the identification of the second virtual object by the identification of the first virtual object. Alternatively, the yellow gradient bar has a width of 21 px, a length of the relative distance of the central points of the serial numbers in the two icons, and a color of FBE627 100%-FBE627 0%.

Step 605: The backend server controls the display to display a second hot zone display element on the virtual map in a case that the first virtual object fires on the second virtual object.

Alternatively, the visual representation of the second hot zone display element is that the first virtual object emits a red gradient bar towards the second virtual object.

The backend server controls the display to display the second hot zone display element on the virtual map in a case the distance of the second virtual object is relatively close, and the first virtual object performs a firing action after the shot of the first virtual object detects that the second virtual object appears in the attack range.

The display style of the second hot zone display element is a red gradient bar that is emitted to the identification of the second virtual object by the identification of the first virtual object. Alternatively, the red gradient bar has a width of 16 px, a length of the relative distance of the central points of the serial numbers in the two icons, and a color of FF5F5F 100%-FF5F5F 0%.

Step 606: The backend server controls the display to cancel the displaying the second hot zone display element on the virtual map in a case that the first virtual object stops firing.

Alternatively, the visual representation of canceling the displaying the second hot zone display element is that the red gradient bar gradually disappears.

Alternatively, canceling the displaying the second hot zone display element may be based on one of the following two conditions: a distance between the first virtual object and the second virtual object exceeds a second preset value, or preset time duration is reached after the first virtual object interacts with the second virtual object.

For example, the displaying the second hot zone display element is canceled, and the red gradient bar gradually disappears in a case that the second virtual object does not appear in the shot of the first virtual object, or 3 seconds is reached after the firing action is completed.

Step 607: The backend server controls the display to cancel the displaying the first hot zone display element on the virtual map in a case that the distance between the first virtual object and the second virtual object is no longer close.

Alternatively, the visual representation of canceling the displaying the first hot zone display element is that the yellow gradient bar gradually disappears.

Herein, canceling the displaying the first hot zone display element is similar to canceling the displaying the second hot zone display element, which may refer to the foregoing and will not be described in detail.

In summary, in the method for displaying a visual field picture provided in the embodiments of this disclosure, the map area in which the first virtual object interacts with the second virtual object can be accurately and timely acquired by displaying the hot zone display element on the virtual map. In addition, interactive information from the perspective of the virtual objects can be acquired by switching to the visual field picture of the corresponding virtual object by the trigger operation on the hot zone display element.

In one example, the method of displaying a visual field picture provided in the above embodiments is applied to a battle watching system. By the battle watching system, a battle watching player can acquire a virtual battle situation of the first virtual object and the second virtual object. For example, the first virtual object and the second virtual object belong to different camps. The hot zone display element is displayed between the identification of the first virtual object and the identification of the second virtual object on the virtual map in a case that the first virtual object interacts with the second virtual object. Subsequently, the battle watching player triggers the hot zone display element to display the visual field picture of the first virtual object or the second virtual object in the battle watching system.

For example, the first virtual object and the second virtual object attack each other, and the first virtual object launches an attack on the second virtual object first. In the virtual map, a gradient bar having bidirectionality will be displayed between the identification of the first virtual object and the identification of the second virtual object. Subsequently, the battle watching player clicks the gradient bar to display the visual field picture of the first virtual object in the battle watching system. The second virtual object and the attack effect of the first virtual object can be displayed in the visual field picture.

In an example, the method of displaying a visual field picture provided in the above embodiments is applied to a battle system. The battle participating player can acquire the interaction condition between the virtual objects belonging to his own camps by the battle system, and can also acquire the virtual battle condition between the virtual objects belonging to his own camps and the virtual objects belonging to the other party's camps by the battle system. The hot zone display element is displayed between the identification of the first virtual object and the identification of the second virtual object on the virtual map in a case that the first virtual object interacts with the second virtual object. Subsequently, the battle watching player triggers the hot zone display element to display the visual field picture of the first virtual object or the second virtual object in the battle watching system.

For example, the first virtual object and the second virtual object belong to the same camp. The first virtual object releases a treatment skill to the second virtual object, and the second virtual object does not release other skills to the first virtual object. In the virtual map, a gradient bar having unidirectionality will be displayed between the identification of the first virtual object and the identification of the second virtual object. Subsequently, the battle watching player clicks the gradient bar to display the visual field picture of the first virtual object in the battle watching system. The second virtual object and the animation effect of the treatment skill released by the first virtual object can be displayed in the visual field picture.

Figure 14:
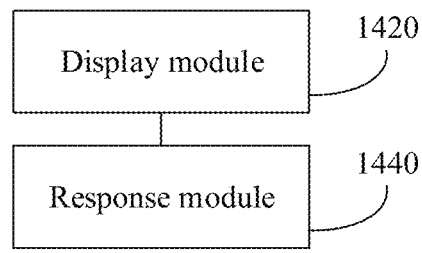
FIG. 14 is a schematic illustration of an apparatus for displaying a visual field picture provided in an exemplary embodiment of this disclosure.

FIG. 14 shows a schematic illustration of an apparatus for displaying a visual field picture provided in an exemplary embodiment of this disclosure. The apparatus includes:

a display module 1420, configured to display a virtual map, the virtual map displaying an identification of a first virtual object and an identification of a second virtual object, and the display module 1420 being further configured to display a hot zone display element on the virtual map in a case that the first virtual object interacts with the second virtual object, the hot zone display element being used for indicating a map area in which the first virtual object interacts with the second virtual object; and a response module 1440, configured to display a visual field picture of the first virtual object or the second virtual object in response to a trigger operation on the hot zone display element.

Alternatively, the display module 1420 is configured to display a first style of the hot zone display element on the virtual map in a case that the first virtual object unidirectionally interacts with the second virtual object, and the second virtual object does not unidirectionally interact with the first virtual object, the first style of the hot zone display element having unidirectionality.

Alternatively, the display module 1420 is configured to display the first style of the hot zone display element between the identification of the first virtual object and the identification of the second virtual object, one end of the first style of the hot zone display element starting from the identification of the first virtual object, and the other end of the first style of the hot zone display element directing to the identification of the second virtual object.

Alternatively, the display module 1420 is configured to display a first gradient bar between the identification of the first virtual object and the identification of the second virtual object, transparency of the first gradient bar gradually increasing from one end near the identification of the first virtual object to the other end near the identification of the second virtual object.

Alternatively, the display module 1420 is configured to display a second style of the hot zone display element on the virtual map in a case that the first virtual object and the second virtual object interact with each other bidirectionally, the second style of the hot zone display element having bidirectionality.

Alternatively, the display module 1420 is configured to display the second style of the hot zone display element between the identification of the first virtual object and the identification of the second virtual object, two ends of the second style of the hot zone display element separately starting from the identification of the first virtual object and the identification of the second virtual object to direct to each other.

Alternatively, the display module 1420 is configured to display a second gradient bar between the identification of the first virtual object and the identification of the second virtual object, transparency of the second gradient bar gradually increasing from the two ends to a middle.

Alternatively, the hot zone display element includes at least one of the following: a first hot zone display element for indicating that the first virtual object and/or the second virtual object appears in a visual field of the other party; a second hot zone display element for indicating that the first virtual object and/or the second virtual object launches an attack on the other party; and a third hot zone display element for indicating a gain interaction of the first virtual object and the second virtual object, the gain interaction being an interaction to increase an attribute value of the first virtual object and/or the second virtual object.

Alternatively, the hot zone display element includes the first hot zone display element. The display module 1420 is configured to display the first hot zone display element between the identification of the first virtual object and the identification of the second virtual object. The response module 1440 is configured to display a visual field picture of a virtual object who finds the other party first of the first virtual object and the second virtual object in response to a trigger operation on the first hot zone display element.

Alternatively, the hot zone display element includes the second hot zone display element. The display module 1420 is configured to display the second hot zone display element between the identification of the first virtual object and the identification of the second virtual object. The response module 1440 is configured to display a visual field picture of a virtual object who launches an attack first of the first virtual object and the second virtual object in response to a trigger operation on the second hot zone display element.

Alternatively, the hot zone display element includes the third hot zone display element. The display module 1420 is configured to display the third hot zone display element between the identification of the first virtual object and the identification of the second virtual object. The response module 1440 is configured to display a visual field picture of a virtual object who performs a gain interaction first of the first virtual object and the second virtual object in response to a trigger operation on the third hot zone display element.

Alternatively, the first hot zone display element, the second hot zone display element, and the third hot zone display element have different display priorities. The display module 1420 is configured to display a hot zone display element with the highest display priority between the identification of the first virtual object and the identification of the second virtual object.

Alternatively, the display module 1420 is configured to display the hot zone display element between the identification of the first virtual object and the identification of the second virtual object in a case that a distance between the first virtual object and the second virtual object reaches a first preset value.

Alternatively, the display module 1420 is further configured to cancel the displaying the hot zone display element in a case that a distance between the first virtual object and the second virtual object exceeds a second preset value, or preset time duration is reached after the first virtual object interacts with the second virtual object.

Figure 15:
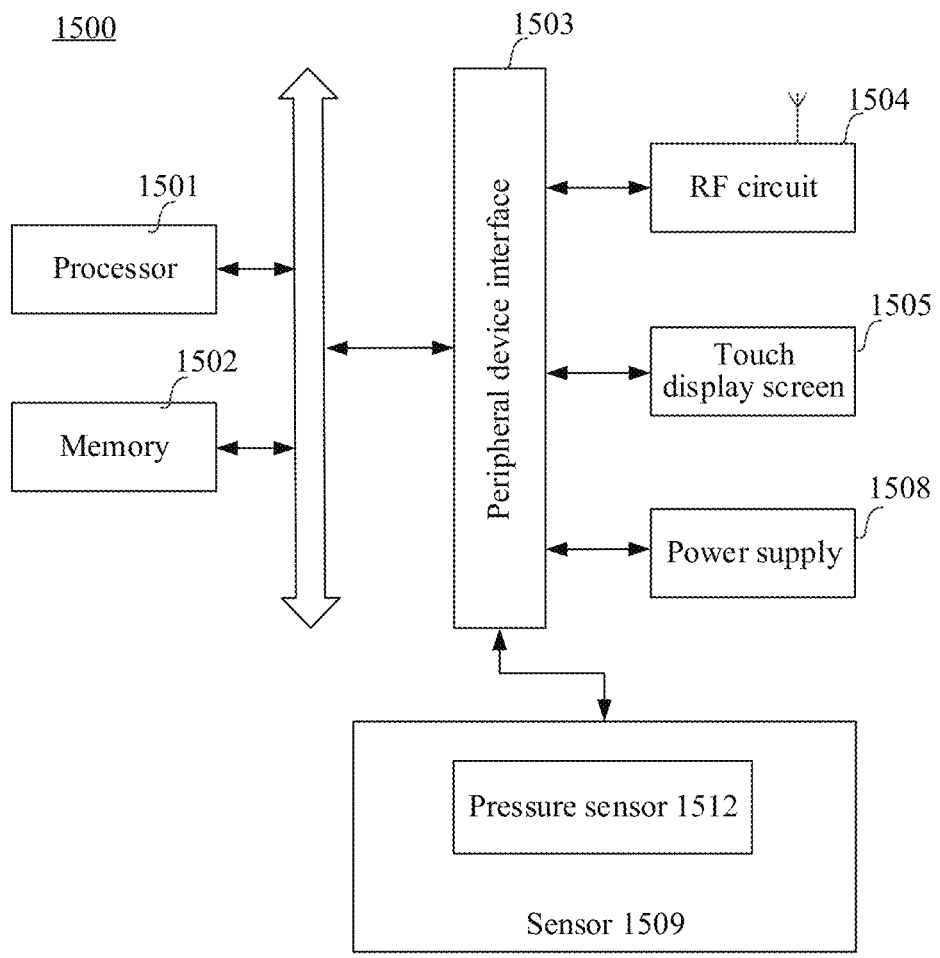
FIG. 15 is a structural block diagram of a terminal provided in an exemplary embodiment of this disclosure.

FIG. 15 shows a structural block diagram of a terminal 1500 provided in an exemplary embodiment of this disclosure. The terminal 1500 may be: a smart phone, a tablet computer, a moving picture experts group audio layer III (MP3) player, a moving picture experts group audio layer IV (MP4) player, a laptop computer, or a desktop computer. The terminal 1500 may also be referred to as other names, such as user equipment, a portable terminal, a laptop terminal, and a desktop terminal.

The terminal 1500 includes: a processor 1501 (processing circuitry) and a memory 1502 (non-transitory computer-readable storage medium). Herein, the term "processing circuitry" includes one or more processors and the term "non-transitory computer-readable storage medium" includes one or more memories or other storage media.

The processor 1501 may include one or more processing cores, such as a 4-core processor and an 8-core processor. The processor 1501 may be implemented in at least one hardware form of the Digital Signal Processing (DSP), Field-Programmable Gate Array (FPGA), and Programmable Logic Array (PLA). The processor 1501 may also include a main processor and a co-processor. The main processor, also referred to as the Central Processing Unit (CPU), is a processor configured to process data in a wake-up state. The co-processor is a low-power processor configured to process data in a standby state. In some embodiments, the processor 1501 may be integrated with a Graphics Processing Unit (GPU). The GPU is configured to be responsible for rendering and drawing the content that the display screen needs to present. In some embodiments, the processor 1501 may also include an artificial intelligence (AI) processor, and the AI processor is configured to process computing operations related to machine learning.

The memory 1502 may include one or more computer-readable storage media, which may be non-transitory. The memory 1502 may further include a high-speed random access memory and a non-volatile memory, for example, one or more disk storage devices or flash storage devices. In some embodiments, a non-transitory computer-readable storage medium in the memory 1502 is configured to store at least one instruction. The at least one instruction is executed by the processor 1501 to implement the method for displaying a visual field picture provided in the method embodiments in this disclosure.

In some embodiments, the terminal 1500 may also alternatively include: a peripheral device interface 1503 and at least one peripheral device. The processor 1501, the memory 1502, and the peripheral device interface 1503 may be connected by a bus or a signal line. Each peripheral device may be connected to the peripheral device interface 1503 by a bus, a signal line, or a circuit board. Specifically, the peripheral device includes at least one of a radio frequency (RF) circuit 1504, a touch display screen 1505, and a power supply 1508.

The peripheral device interface 1503 may be configured to connect the at least one peripheral device related to input/output (I/O) to the processor 1501 and the memory 1502. In some embodiments, the processor 1501, the memory 1502, and the peripheral device interface 1503 are integrated on the same chip or circuit board. In some other embodiments, any one or two of the processor 1501, the memory 1502, and the peripheral device interface 1503 may be implemented on a separate chip or circuit board, which is not limited in the embodiments of this disclosure.

The RF circuitry 1504 is configured to receive and transmit a RF signal, also referred to as an electromagnetic signal. The RF circuit 1504 may communicate with communication networks and other communication devices by the electromagnetic signal. The RF circuit 1504 converts an electrical signal into the electromagnetic signal for transmission, or converts the received electromagnetic signal into the electrical signal. Alternatively, the RF circuit 1504 includes an antenna system, an RF transceiver, one or more amplifiers, a tuner, an oscillator, a digital signal processor, a codec chipset, and a subscriber identity module card. The RF circuit 1504 may communicate with other terminals by at least one wireless communication protocol. The wireless communication protocol includes, but is not limited to the world wide web, the metropolitan area network, the Intranet, generations of mobile communication networks (2G, 3G, 4G, and 5G), the wireless local area network, and/or the wireless fidelity (WiFi) network.

The touch display screen 1505 is configured to display a user interface (UI). The UI may include a graphic, a text, an icon, a video, and any combination thereof. The touch display screen 1505 also has the ability to collect the touch signal at or above the surface of the touch display screen 1505. The touch signal may be inputted to the processor 1501 as a control signal for processing. At this point, the touch display screen 1505 may also be configured to provide virtual buttons and/or virtual keyboards, also referred to as soft buttons and/or soft keyboards. In some embodiments, the touch display screen 1505 may be one, and it is provided on a front panel of the terminal 1500. In some other embodiments, the touch display screens 1505 may be at least two, separately arranged on different surfaces of the terminal 1500 or in a folded design. In other embodiments, the touch display screen 1505 may be a flexible display screen disposed on a curved or folded surface of the terminal 1500. Further, the touch display screen 1505 may be arranged in a non-rectangular irregular graphic, i.e., a special-shaped screen. The touch display screen 1505 can be made of materials, such as the liquid crystal display (LCD) and the organic light-emitting diode (OLED).

The power supply 1508 is configured to supply power to the respective components in the terminal 1500. The power supply 1508 may be AC, DC, a disposable battery, or a rechargeable battery. When the power supply 1508 includes the rechargeable battery, the rechargeable battery may be a wired rechargeable battery or a wireless rechargeable battery. The wired rechargeable battery is a battery charged by the wireline, and the wireless rechargeable battery is a battery charged by wireless coils. The rechargeable battery may also be used to support fast charge technology.

In some embodiments, the terminal 1500 may also alternatively include one or more sensors 1509. The one or more sensors 1509 include, but are not limited to: a pressure sensor 1512.

The pressure sensor 1512 may be disposed on a side frame of the terminal 1500 and/or a lower layer of the touch display screen 1505. When the pressure sensor 1512 is arranged on the side frame of the terminal 1500, a holding signal of the user to the terminal 1500 can be detected, and the processor 1501 performs left-right hand recognition or quick operation based on the holding signal collected by the pressure sensor 1512. When the pressure sensor 1512 is arranged on the lower layer of the touch display screen 1505, the processor 1501 controls the operable control on the UI according to the pressure operation of the user on the touch display screen 1505. The operable control includes at least one of a button control, a scroll bar control, an icon control, and a menu control.

It will be understood by those skilled in the art that the structures shown in FIG. 15 are not limiting the terminal 1500 and may include more or fewer components than the illustration, or some components may be combined, or a different arrangement of components may be employed.

This disclosure further provides a computer device, including a processor, the processor being configured to display a virtual map, the virtual map displaying an identification of a first virtual object and an identification of a second virtual object; display a hot zone display element on the virtual map in a case that the first virtual object interacts with the second virtual object, the hot zone display element being used for indicating a map area in which the first virtual object interacts with the second virtual object; and display a visual field picture of the first virtual object or the second virtual object in response to a trigger operation on the hot zone display element.

This disclosure further provides a computer-readable storage medium, storing a computer program therein, the computer program being executed by a processor to perform the method for displaying a visual field picture described above.

This disclosure further provides a chip, including a programmable logic circuitry and/or a program instruction for implementing, when the chip is run, the method for displaying a visual field picture described above.

This disclosure further provides a computer program product or a computer program, including a computer instruction stored in a computer-readable storage medium, a processor reading and executing the computer instruction from the computer-readable storage medium to perform the method for displaying a visual field picture described above.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A method for displaying a visual field picture, the method comprising:
    displaying a virtual map of a virtual environment including an identification of a first virtual object and an identification of a second virtual object in the virtual environment;
    displaying a hot zone display element on the virtual map in response to a determination that the first virtual object interacts with the second virtual object, the hot zone display element indicating a map area in which the first virtual object interacts with the second virtual object; and
    displaying a visual field picture of the virtual environment from a perspective of the first virtual object or the second virtual object in response to a trigger operation on the hot zone display element.

2. The method according to claim 1, wherein the displaying the hot zone display element comprises:
- displaying a first style of the hot zone display element on the virtual map in response to a determination that the first virtual object unidirectionally interacts with the second virtual object, and the second virtual object does not interact with the first virtual object, the first style of the hot zone display element indicating unidirectionality from the first virtual object to the second virtual object.

3. The method according to claim 2, wherein the displaying the first style of the hot zone display element on the virtual map comprises:
- displaying the first style of the hot zone display element between the identification of the first virtual object and the identification of the second virtual object on the virtual map, one end of the first style of the hot zone display element starting from the identification of the first virtual object, and the other end of the first style of the hot zone display element directing to the identification of the second virtual object.

4. The method according to claim 3, wherein the displaying the first style of the hot zone display element between the identification of the first virtual object and the identification of the second virtual object comprises:
- displaying a first gradient bar between the identification of the first virtual object and the identification of the second virtual object on the virtual map, transparency of the first gradient bar gradually increasing from one end near the identification of the first virtual object to an end near the identification of the second virtual object.

5. The method according to claim 1, wherein the displaying the hot zone display element on the virtual map comprises:
- displaying a second style of the hot zone display element on the virtual map in response to a determination that the first virtual object and the second virtual object mutually interact with each other, the second style of the hot zone display element having bidirectionality.

6. The method according to claim 5, wherein the displaying the second style of the hot zone display element on the virtual map comprises:
- displaying the second style of the hot zone display element between the identification of the first virtual object and the identification of the second virtual object on the virtual map, opposing ends of the second style of the hot zone display element respectively corresponding to the identification of the first virtual object and the identification of the second virtual object to direct to each other.

7. The method according to claim 6, wherein the displaying the second style of the hot zone display element between the identification of the first virtual object and the identification of the second virtual object comprises:
- displaying a second gradient bar between the identification of the first virtual object and the identification of the second virtual object on the virtual map, transparency of the second gradient bar gradually increasing from the opposing ends to a middle.

8. The method according to claim 1, wherein the hot zone display element comprises at least one of:
- a first hot zone display element indicating that one of the first virtual object or the second virtual object appears in a visual field of another one of the first virtual object or the second virtual object;
- a second hot zone display element indicating that one of the first virtual object or the second virtual object launches an attack on the another one of the first virtual object or the second virtual object; and
- a third hot zone display element indicating a gain interaction of the first virtual object or the second virtual object, the gain interaction being an interaction to increase an attribute value of the first virtual object or the second virtual object.

9. The method according to claim 8, wherein
the hot zone display element comprises the first hot zone display element;
the displaying the hot zone display element on the virtual map comprises:
- displaying the first hot zone display element between the identification of the first virtual object and the identification of the second virtual object on the virtual map; and the displaying the visual field picture comprises:
- displaying the visual field picture of the virtual environment from a perspective of a virtual object, among the first virtual object and the second virtual object, who finds t another one of the first virtual object and the second virtual object in response to a trigger operation on the first hot zone display element.

10. The method according to claim 8, wherein
the hot zone display element comprises the second hot zone display element;
the displaying the hot zone display element on the virtual map comprises:
- displaying the second hot zone display element between the identification of the first virtual object and the identification of the second virtual object; and the displaying the visual field picture comprises:
- displaying the visual field picture of a virtual object, among the first virtual object and the second virtual object, who launches the attack first in response to a trigger operation on the second hot zone display element.

11. The method according to claim 8, wherein
the hot zone display element comprises the third hot zone display element;
the displaying the hot zone display element on the virtual map comprises:
- displaying the third hot zone display element between the identification of the first virtual object and the identification of the second virtual object; and the displaying the visual field picture comprises:
- displaying the visual field picture of a virtual object, among the first virtual object and the second virtual object, who performs the gain interaction first in response to a trigger operation on the third hot zone display element.

12. The method according to claim 8, wherein
The first hot zone display element, the second hot zone display element, and the third hot zone display element have different display priorities; and
the displaying the hot zone display element on the virtual map comprises:
- displaying the hot zone display element with the highest display priority between the identification of the first virtual object and the identification of the second virtual object.

13. The method according to claim 1, wherein the displaying the hot zone display element on the virtual map comprises:
displaying the hot zone display element between the identification of the first virtual object and the identification of the second virtual object on the virtual map in response to a determination that a distance between the first virtual object and the second virtual object reaches a first preset value.

14. The method according to claim 1, further comprising:
canceling the displaying the hot zone display element in response to a determination that a distance between the first virtual object and the second virtual object exceeds a second preset value, or a preset time duration is reached after the first virtual object interacts with the second virtual object.

15. An apparatus for displaying a visual field picture, comprising:
processing circuitry configured to
display a virtual map of a virtual environment including an identification of a first virtual object and an identification of a second virtual object in the virtual environment;
display a hot zone display element on the virtual map in response to a determination that the first virtual object interacts with the second virtual object, the hot zone display element indicating a map area in which the first virtual object interacts with the second virtual object; and
display a visual field picture of the virtual environment from a perspective of the first virtual object or the second virtual object in response to a trigger operation on the hot zone display element.

16. The apparatus according to claim 15, wherein the processing circuitry is configured to display a first style of the hot zone display element on the virtual map in response to a determination that the first virtual object unidirectionally interacts with the second virtual object, and the second virtual object does not interact with the first virtual object, the first style of the hot zone display element indicating unidirectionality from the first virtual object to the second virtual object.

17. The apparatus according to claim 16, wherein the processing circuitry is configured to display the first style of the hot zone display element between the identification of the first virtual object and the identification of the second virtual object on the virtual map, one end of the first style of the hot zone display element starting from the identification of the first virtual object, and the other end of the first style of the hot zone display element directing to the identification of the second virtual object.

18. The apparatus according to claim 17, wherein the processing circuitry is further configured to:
display a first gradient bar between the identification of the first virtual object and the identification of the second virtual object on the virtual map, transparency of the first gradient bar gradually increasing from one end near the identification of the first virtual object to an end near the identification of the second virtual object.

19. The apparatus according to claim 15, wherein the processing circuitry is further configured to:
display a second style of the hot zone display element on the virtual map in response to a determination that the first virtual object and the second virtual object mutually interact with each other, the second style of the hot zone display element having bidirectionality.

20. A non-transitory computer-readable storage medium storing computer-readable instructions thereon, which, when executed by processing circuitry, cause the processing circuitry to perform a method comprising:
displaying a virtual map of a virtual environment including an identification of a first virtual object and an identification of a second virtual object in the virtual environment;
displaying a hot zone display element on the virtual map in response to a determination that the first virtual object interacts with the second virtual object, the hot zone display element indicating a map area in which the first virtual object interacts with the second virtual object; and
displaying a visual field picture of the virtual environment from a perspective of the first virtual object or the second virtual object in response to a trigger operation on the hot zone display element.

\* \* \* \* \*